United States Patent
Choi et al.

(10) Patent No.: US 10,191,616 B2
(45) Date of Patent: Jan. 29, 2019

(54) METHOD AND SYSTEM FOR TAGGING INFORMATION ABOUT IMAGE, APPARATUS AND COMPUTER-READABLE RECORDING MEDIUM THEREOF

(71) Applicant: SAMSUNG ELECTRONICS CO., LTD., Suwon-si (KR)

(72) Inventors: Won-jong Choi, Daejeon (KR); Hyung-tak Choi, Suwon-si (KR); O-hoon Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 728 days.

(21) Appl. No.: 13/959,859

(22) Filed: Aug. 6, 2013

(65) Prior Publication Data
US 2014/0040828 A1 Feb. 6, 2014

(30) Foreign Application Priority Data

Aug. 6, 2012 (KR) .................. 10-2012-0086003

(51) Int. Cl.
| | | |
|---|---|---|
| G06F 3/14 | (2006.01) | |
| G06F 3/0482 | (2013.01) | |
| G11B 27/34 | (2006.01) | |
| H04N 1/32 | (2006.01) | |
| G06F 3/0488 | (2013.01) | |
| G06F 3/0484 | (2013.01) | |
| G06F 17/30 | (2006.01) | |

(52) U.S. Cl.
CPC ........ *G06F 3/0482* (2013.01); *G06F 3/04842* (2013.01); *G06F 3/04883* (2013.01); *G06F 17/30268* (2013.01); *G11B 27/34* (2013.01); *H04N 1/32101* (2013.01)

(58) Field of Classification Search
CPC ..................................... G06F 3/14; G06F 3/17
USPC ........ 715/835, 810; 382/224, 225, 118, 312; 345/619; 707/736, 3, 758; 726/27
See application file for complete search history.

(56) References Cited

U.S. PATENT DOCUMENTS

| | | | |
|---|---|---|---|
| 7,889,946 B1 | 2/2011 | Bourdev | |
| 2005/0246324 A1* | 11/2005 | Paalasmaa | ........ G06F 17/30675 |
| 2008/0201734 A1 | 8/2008 | Lyon et al. | |

(Continued)

FOREIGN PATENT DOCUMENTS

| | | |
|---|---|---|
| CN | 101354791 A | 1/2009 |
| CN | 102334115 A | 1/2012 |

(Continued)

OTHER PUBLICATIONS

Communication dated Apr. 7, 2014 issued by the European Patent Office in counterpart European Application No. 13179427.3.

(Continued)

*Primary Examiner* — Ruay Ho
(74) *Attorney, Agent, or Firm* — Sughrue Mion, PLLC

(57) ABSTRACT

A method, a system, an apparatus, and a computer readable medium storing instructions for tagging information about an object included in an image to the image. The tagging information is used for searching for the image. The method includes detecting one or more objects included in a displayed image. The method also includes receiving, from a user, information about the detected object, and tagging the received information to the displayed image.

26 Claims, 19 Drawing Sheets

(56) References Cited

U.S. PATENT DOCUMENTS

| | | | |
|---|---|---|---|
| 2009/0046954 A1* | 2/2009 | Ishii | G06K 9/00221 |
| | | | 382/312 |
| 2010/0054601 A1 | 3/2010 | Anbalagan et al. | |
| 2010/0124378 A1* | 5/2010 | Das | G06F 17/30247 |
| | | | 382/225 |
| 2010/0214321 A1 | 8/2010 | Hokkanen et al. | |
| 2010/0216441 A1 | 8/2010 | Larsson et al. | |
| 2010/0318510 A1 | 12/2010 | Ryu | |
| 2011/0078714 A1 | 3/2011 | Sagayaraj et al. | |
| 2011/0116690 A1* | 5/2011 | Ross | G06K 9/00295 |
| | | | 382/118 |
| 2011/0199389 A1* | 8/2011 | Lu | G06F 3/017 |
| | | | 345/619 |
| 2011/0211736 A1 | 9/2011 | Krupka et al. | |
| 2012/0239673 A1* | 9/2012 | Yun | G06F 17/30247 |
| | | | 707/758 |
| 2013/0046761 A1* | 2/2013 | Soderberg | G06F 17/30038 |
| | | | 707/736 |
| 2013/0129231 A1* | 5/2013 | Dale | G06K 9/6254 |
| | | | 382/224 |
| 2013/0139060 A1 | 5/2013 | Chae | |
| 2014/0129981 A1* | 5/2014 | Soderberg | G06F 17/30265 |
| | | | 715/810 |
| 2015/0033362 A1* | 1/2015 | Mau | G06K 9/00288 |
| | | | 726/27 |

FOREIGN PATENT DOCUMENTS

| | | |
|---|---|---|
| CN | 102334132 A | 1/2012 |
| EP | 1 990 744 A1 | 11/2008 |
| KR | 10-0796044 B1 | 1/2008 |
| KR | 1020110135178 A | 12/2011 |
| KR | 10-2012-0002719 A | 1/2012 |

OTHER PUBLICATIONS

Lutz Goldmann et al., "Multimodal Person Search Combining Information Fusion and Relevance Feedback", Multimedia Signal Processing, Oct. 5, 2009, 6 pgs. total, XP031550787.

Written Opinion dated Nov. 13, 2013, issued by the International Searching Authority in counterpart International Application No. PCT/KR2013/007065.

International Search Report dated Nov. 13, 2013, issued by the International Searching Authority in counterpart International Application No. PCT/KR2013/007065.

Communication dated Jan. 15, 2016, issued by the European Patent Office in counterpart European Patent Application No. 13179427.3.

Communication dated Feb. 5, 2016, issued by the Australian Patent Office in counterpart Australian Patent Application No. 2013300316.

Communication dated Jun. 20, 2017 by the State Intellectual Property Office of P.R. China in counterpart Chinese Patent Application No. 201310338529.X.

Communication dated Mar. 5, 2018, issued by the Chinese Patent Office in counterpart Chinese Patent Application No. 201310338529.X.

\* cited by examiner

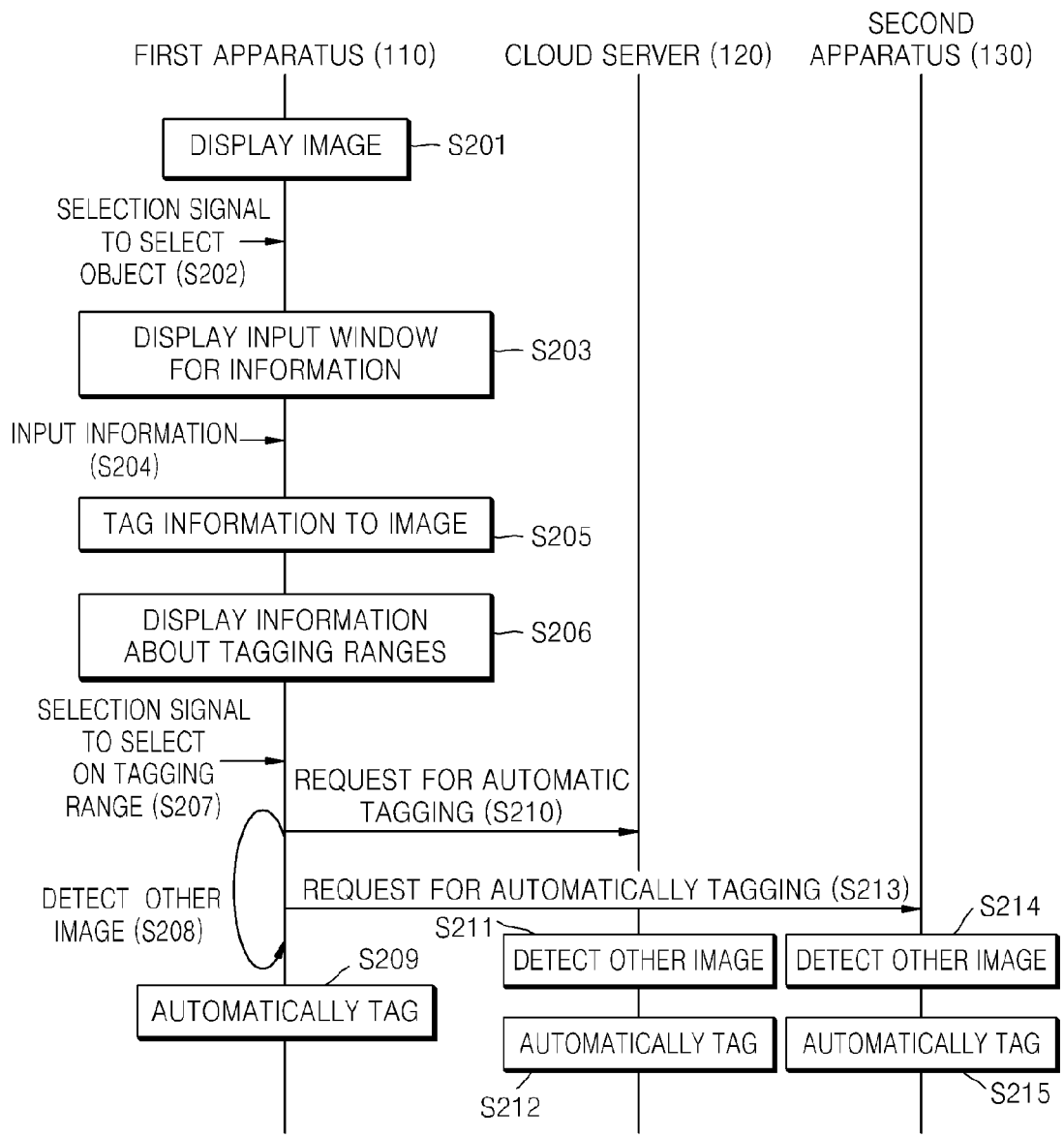

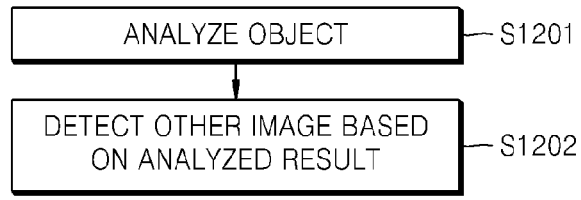
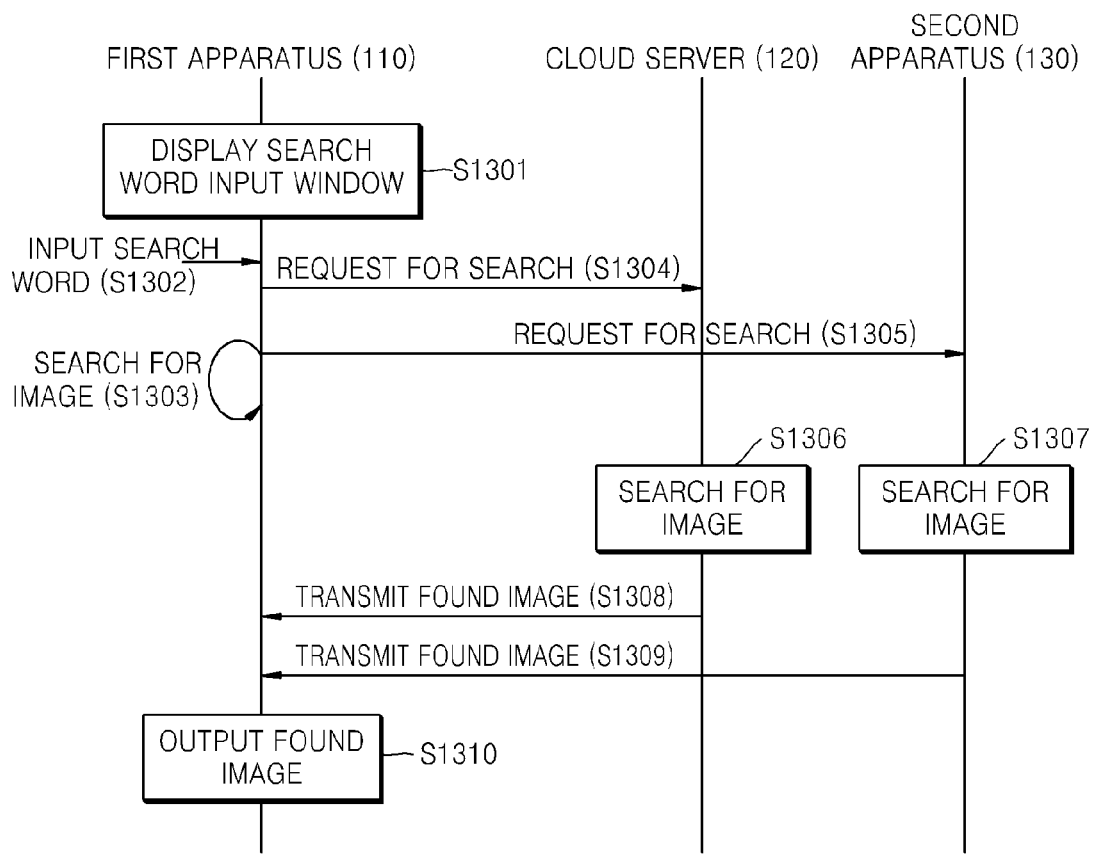

METHOD AND SYSTEM FOR TAGGING INFORMATION ABOUT IMAGE, APPARATUS AND COMPUTER-READABLE RECORDING MEDIUM THEREOF

CROSS-REFERENCE TO RELATED PATENT APPLICATION

This application claims the benefit of priority from Korean Patent Application No. 10-2012-0086003, filed on Aug. 6, 2012, in the Korean Intellectual Property Office, the disclosure of which is incorporated herein by reference in its entirety.

BACKGROUND

1. Field

Methods and systems consistent with exemplary embodiments broadly relate to tagging information and searching for an image and apparatuses and computer-readable mediums thereof, and more particularly, to a method and a system for tagging information to an image and searching for an image by using the tagged information, and an apparatus and a computer-readable recording medium thereof.

2. Description of the Related Art

The number of users who store a large amount of images not only in apparatuses, such as smartphones, handheld personal computers (PCs), tablets, and smart TVs, but also in cloud servers has increased.

In this case, a user has to classify in great detail images and store images in order to easily and quickly search for a desired image. However, even when the images are classified in great detail and stored, the user has to open and check the images one-by-one in order to search for an image which would include a desired object. Thus, it may be difficult for the user to search for the image which would include the desired object if the user has a massive amount of images.

SUMMARY

Exemplary embodiments may overcome the above disadvantages and other disadvantages not described above. Exemplary embodiments are not required to overcome the disadvantages described above, and an exemplary embodiment may not overcome any of the problems described above.

Exemplary embodiments may provide a method and a system for tagging information based on an object included in an image to the image, and an apparatus and a non-transitory computer-readable recording medium thereof.

Exemplary embodiments also provides a method and system for searching for an image by using custom information input by the user that is tagged to the image based on an object in the image, and an apparatus and a non-transitory computer-readable recording medium thereof.

According to an aspect of an exemplary embodiment, there is provided a method of tagging information, the method including: detecting at least one object in a displayed image; receiving, from a user, information related to the detected object; and tagging the received information to the displayed image.

The receiving of the information may include receiving a selection signal from the user which is about the detected object.

The receiving of the information may further include: displaying a graphical user interface (GUI) configured to receive input of the information; and receiving the input of the information as information related to the detected object selected according to the selection signal.

The receiving the selection signal may include receiving a touch sensing signal with respect to the detected object as the selection signal from the user about the detected object.

The detecting of the object may include detecting a number of objects which include the object and at least one additional object. The receiving the selection signal may include receiving a multi-touch sensing signal with respect to the detected plurality of objects as the selection signal from the user about the plurality of objects.

The detecting the object may include displaying in the displayed image information indicating that the object is detected.

The receiving the selection signal may include receiving the selection signal from the user about the object included in a region of the displayed image as the region is set by a touch-and-drag operation on the displayed image.

The method may further include automatically tagging the information received from the user to another image which includes the detected object.

According to yet another aspect of an exemplary embodiment, there is provided an apparatus including: an input and output interface configured to receive input information from a user, and configured to output a user interface object and information; and a processor configured to detect at least one object included in a displayed image based on input received from the input and output interface, configured to receive information about the detected object input by the user via the input and output interface, and configured to tag the received information to the displayed image.

According to yet another aspect of an exemplary embodiment, there is provided an apparatus including: a touch screen configured to receive touch-based user input information, and configured to display data related to tagging of information to a displayed image; at least one processor configured to provide a user interface by controlling the touch screen; a communicator configured to communicate with at least one external apparatus; and a memory configured to store at least one program configured to be executed by the at least one processor, and the data related to the tagging of the information, wherein the at least one program includes commands for detecting at least one object included in the displayed image, commands for receiving information about the detected object from a user, and tagging the received information to the displayed image.

According to yet another aspect of an exemplary embodiment, there is provided a system for tagging information to an image, the system including: an apparatus configured to detect at least one object included in a displayed image, configured to receive from a user information about the detected object, configured to tag the received information to the displayed image, and configured to automatically tag the information to another image which includes the detected object; and at least one external apparatus configured to store the other image.

According to yet another aspect of an exemplary embodiment, there is provided a method of tagging information about an image, the method including: receiving information indicating a meaning or an attribute to a user of at least one object included in a displayed image; tagging the received information to the displayed image; and automatically tagging the information received from the user to another image which includes the object.

The receiving the information may include: receiving a selection signal from the user about a plurality of objects included in the displayed image, wherein the plurality of objects include the object; displaying an input window configured to receive the information; and receiving via the input window the information as additional information about an object group which comprises the plurality of objects.

The other image may be detected based on at least one of a face recognition technology and matching technology, an object recognition technology and matching technology, a character recognition technology and matching technology, a contour detection technology and matching technology, and a feature point detection technology and matching technology.

The receiving the information may include: receiving a selection signal from the user of at least one object included in the displayed image; displaying an input window configured to receive the information; and receiving via the input window the information as additional information about the detected object.

The selection signal may be received as a touch of the object in the displayed image is, as a multi-touch of the plurality of objects is detected, as a region which includes the plurality of objects is set according to a touch-and-drag operation, or as a space gesture of the user indicating selection of the object is recognized.

The displaying of the input window may include displaying selectable completed information whenever one character is input.

The tagging of the information to the displayed image and the tagging of the information to the other image may be performed by adding the information to metadata of a corresponding image.

According to yet another aspect of an exemplary embodiment, there is provided an apparatus including: an input and output interface configured to receive input information from a user, and configured to output a user interface object and information; and a processor configured to receive via the input and output interface information indicating a meaning or an attribute to a user of at least one object included in a displayed image, configured to tag the received information to the displayed image, and configured to automatically tag the information to another image which includes the object.

According to yet another aspect of an exemplary embodiment, there is provided an apparatus including: a touch screen configured to receive touch-based user input information, and configured to display information related to tagging of information about a displayed image; at least one processor configured to provide a user interface by controlling the touch screen; a communicator configured to communicate with at least one external apparatus; and a memory configured to store at least one program configured to be executed by the at least one processor, and the information related to the tagging of the information, wherein the at least one program comprises commands for detecting at least one object included in the displayed image, commands for receiving from the user information indicating a custom description about the detected object, tagging the received information to the displayed image, and automatically tagging the received information to another image which includes the object.

According to yet another aspect of an exemplary embodiment, there is provided a system for tagging information, the system including: an apparatus configured to receive from a user custom information about at least one object included in a displayed image, tag the received custom information to the displayed image, and automatically tag the received custom information to another image which includes the object; and at least one external apparatus configured to store the other image.

According to yet another aspect of an exemplary embodiment, there is provided a method of searching for an image, the method including: detecting at least one object included in an image; receiving from a user custom information about the detected object; tagging the received information to the image; automatically tagging the received information to another image which includes the object; and searching for and displaying the image and the other image to which the information is tagged according to a search request which includes the information.

According to yet another aspect of an exemplary embodiment, there is provided a non-transitory computer-readable recording medium having recorded thereon one or more programs for executing the method of tagging information to an image.

According to yet another aspect of an exemplary embodiment, there is provided a non-transitory computer-readable recording medium having recorded thereon one or more programs for executing the method of searching for an image.

BRIEF DESCRIPTION OF THE DRAWINGS

The above and other aspects will become more apparent by describing in detail exemplary embodiments thereof with reference to the attached drawings in which:

FIG. 2 is a flowchart illustrating a method of tagging information about an image, according to an exemplary embodiment;

FIG. 12 is a flowchart illustrating detecting of another image according to an exemplary embodiment;

FIG. 13 is a flowchart illustrating a method of searching for an image according to an exemplary embodiment;

DETAILED DESCRIPTION OF THE EXEMPLARY EMBODIMENTS

Figure 1:
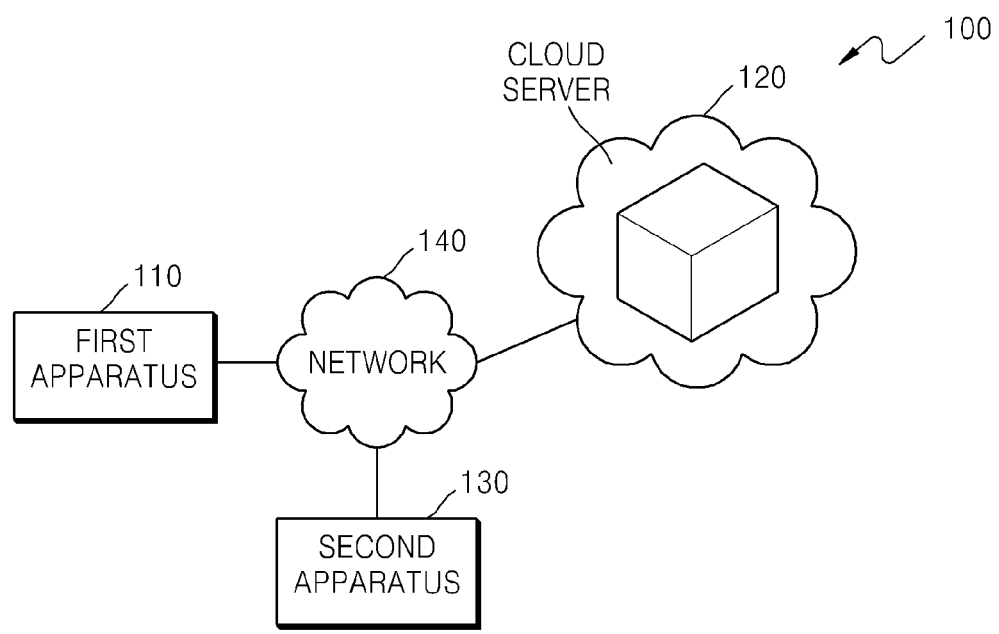
FIG. 1 is a view illustrating a system for tagging information about an image and searching for an image, according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice, and it will to be appreciated that all changes, equivalents, and substitutes that do not depart from the spirit and technical scope of the inventive concept are encompassed herein. In the description of exemplary embodiments, certain detailed explanations of related art are omitted when it is deemed that they may unnecessarily obscure the essence of the exemplary embodiments.

While such terms as "first", "second", etc., may be used to describe various components, such components must not be limited to the above terms. The above terms are used only to distinguish one component from another.

The terms used in the present specification are merely used to describe particular exemplary embodiments, and are not intended to limit the scope of the inventive concept. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of exemplary embodiments. Thus, the terms used herein have to be defined based on the meaning of the terms together with the description throughout the specification. Screens suggested in exemplary embodiments are used only for descriptive purposes, and are not intended to limit the scope of the inventive concept.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As used herein, the term "and/or" includes any and all combinations of one or more of the associated listed items. Expressions such as "at least one of," when preceding a list of elements, modify the entire list of elements and do not modify the individual elements of the list.

An image mentioned throughout the specification includes at least one object. The image may be expressed as image content or content including the at least one object. An object may include a person, an object, an animal, a flower, a building, a view, or food, but it is not limited thereto but provided by way of an example only. The image may be a still image, such as a photograph, or an image in a frame unit extracted from a moving image.

Information to be tagged to an image mentioned throughout the specification is information indicating an intention of a user about at least one object included in an image. Thus, the information is highly related to a thought of the user on the at least one object included in the image. The information to be tagged to the image may be referred to as an additional information of the image. The information may be used as a search keyword for the image. When the image includes a plurality of objects, the plurality of objects may be grouped into an object group, and information indicating an intention of a user on each object included in the object group or information indicating an intention of a user on the grouped objects may be tagged to the image. For example, the plurality of objects may be grouped into one object group, and one piece of information indicating an intention of the user on the object group may be tagged to the image.

Thus, when an image is to be searched for by using information, an image including a desired object or an image including an object group including a plurality of desired objects may be searched for. For example, when the plurality of objects included in the image are grouped into one object group, one piece of information is tagged, and an image is searched for by using the tagged information, only the image including the plurality of objects may be searched for. Tagging means an operation of an apparatus attaching information to an image.

Information may be input through a graphical user interface (GUI) object. The GUI according to an exemplary embodiment is an object required for an interface between a user and an apparatus. Examples of the GUI include an input window capable of receiving information expressed in characters and/or numbers, a virtual keyboard, and a guide window for guiding an activation state of a voice signal input by a user, but they are not limited thereto.

Input information of a user mentioned throughout the specification may be dependent upon text, an image, or a physical button controlled by a gesture of a user, a voice signal of a user, or a touch tool.

The gesture of the user may be variously defined according to an input device. In other words, when the input device is based on a touch screen, examples of the gesture may include touch-based motions on the touch screen, such as tap, touch-and-hold, double tap, drag, touch-and-drag, panning, flick, drag-and-drop, and sweep, but they are not limited thereto.

A touch of the user on the touch screen may be performed by a finger or a touch tool of the user. An example of the touch tool includes a stylus, but it is not limited thereto. The touch tool may be an external input device.

When the input device is based on a motion sensor, input information of the user may be dependent upon a gesture of the user based on movement of the apparatus. Examples of the movement of the apparatus include shaking of the apparatus and hitting of the apparatus. Examples of the motion sensor include an acceleration sensor, a geomagnetic sensor, a gyro sensor, and an orientation sensor.

When the input device is based on a camera, input information of the user may include face recognition-based authentication information of the user and hand-based gesture information of the user. An example of a hand-based gesture of the user may include a space gesture based on an image captured by the camera. In other words, the hand-based gesture related to the input information may be based on a space gesture or space operation according to a moving direction or sign of the hand captured by the camera.

For example, a pointing location on a screen may be changed according to a moving direction of a hand, and the pointing location on the screen may be determined when a user clenches his/her fist. A plurality of images may be gathered at the determined pointing location, and when the user opens and moves his/her hand, the images may be scattered and displayed on a screen in a direction the hand is opened and moved. When the hand draws a circle in a counterclockwise direction after the images are scattered and displayed on the screen, a return function may be performed and the images may be displayed in one location as in a previous screen. The camera may be based on an image sensor or an optical sensor.

According to an exemplary embodiment, input information of a user based on a space gesture drawing a closed path indicating selection of an object included in an image or a space gesture pointing at an object may be detected from an image, which includes the space gesture, captured by a camera.

When the input device not only includes a physical button, but also includes a dial, a slider switch, a joystick, and a click wheel, input information may be dependent upon a physical control by a user of the input device. When the input device is based on an audio input device, the input information may be dependent upon a voice signal provided by the user based on a natural language provided.

Hereinafter, exemplary embodiments will be described in detail with reference to accompanying drawings, wherein like reference numerals denote analogous elements not to provide repeated descriptions.

FIG. 1 is a diagram illustrating a system 100 for tagging information about an image and searching for an image, according to an exemplary embodiment. Referring to FIG. 1, the system 100 includes a first apparatus 110, a cloud server 120, a second apparatus 130, and a network 140. The system 100 of FIG. 1 may be referred to as a network for performing a method of tagging information about an image and searching for an image. Alternatively, the system 100 may be referred to as a system for tagging information about an image or a system for searching for an image based on a performed operation.

Examples of the first apparatus 110 include a smartphone, a laptop, a tablet, a mobile device, a handheld device, a handheld PC, a personal digital assistant (PDA), a smart TV, and a digital consumer electronics (CE) apparatus having a communication function and a display function, but they are not limited thereto. Exemplary first apparatus 110 may include at least a processor and a display.

The first apparatus 110 detects at least one object included in an image displayed on the first apparatus 110, and receives at least one piece of information about the detected at least one object from a user. Before receiving the information, the first apparatus 110 may receive a selection signal from the user about the detected at least one object. The first apparatus 110 tags the received at least one piece of information to the image. The first apparatus 110 has a function of automatically tagging information received from the user to another image including the at least one object. Accordingly, in an exemplary embodiment, the first apparatus 110 may execute an information tagging application to provide an information tagging service to the user.

Also, the first apparatus 110 may search for and output the image by using the information about the object as a search word (or a search keyword). Accordingly, in an exemplary embodiment, the first apparatus 110 may execute an image search application to provide an image search service to the user. The image search application and the information tagging application may be realized as one application or one service.

The cloud server 120 may store various contents including the image and/or various applications. The cloud server 120 may be referred to as a cloud storage or a content providing server, or an application providing server or cloud. The cloud server 120 may include a plurality of cloud servers. By way of an example, the cloud server 120 may include a processor and a memory.

When the cloud server 120 stores the image displayed on the first apparatus 110, the image may be provided to the first apparatus 110 upon a request from the first apparatus 110. Also, the cloud server 120 may store another image, detect the other image upon a request from the first apparatus 110, and automatically tag the information to the other image.

Alternatively, according to an exemplary embodiment, the system 100 may be configured such that the other image detected by the cloud server 120 is transmitted to the first apparatus 110, and the first apparatus 110 automatically tags the information to the other image received from the cloud server 120. The cloud server 120 may be included in an external apparatus connected to the first apparatus 110.

Analogous to the first apparatus 110, examples of the second apparatus 130 include a smartphone, a laptop, a tablet, a mobile device, a handheld apparatus, a handheld PC, a PDA, a smart TV, and a digital CE apparatus having a communication function and a display function, but they are not limited thereto. Exemplary first apparatus 110 may include at least a processor and a display.

The second apparatus 130 may be a peripheral apparatus of the first apparatus 110, and is an apparatus that is connectable to the first apparatus 110 via a short-range wireless communication. Examples of the short-range wireless communication include a near field communication (NFC) network, a Bluetooth network, and a radio frequency identification (RFID) network, but they are not limited thereto. The second apparatus 130 may be included in an external apparatus of the first apparatus 110. Accordingly, in an exemplary embodiment, an external apparatus mentioned throughout the specification may include at least one of the cloud server 120 and the second apparatus 130.

The second apparatus 130 may store the image displayed on the first apparatus 110 and/or the other image. When the second apparatus 130 stores the image displayed on the first apparatus 110, the second apparatus 130 may transmit the image to the first apparatus 110 upon a request from the first apparatus 110, and the first apparatus 110 may display the image received from the second apparatus 130 so as to tag the information as described above by way of an example. Also, when the second apparatus 130 stores the other image, the second apparatus 130 may detect the other image according to a request from the first apparatus 110, and automatically tag the information to the other image.

Alternatively, according to an exemplary embodiment, the system 100 may be configured such that the second apparatus 130 transmits the other image to the first apparatus 110, and the first apparatus 110 automatically tags the information to the other image received from the second apparatus 130.

The network 140 includes a wired network and/or a wireless network. The network 140 will be described in detail later while describing a communication unit 503 of FIG. 5 according to an exemplary embodiment.

FIG. 2 is a flowchart illustrating a method of tagging information about an image, according to an exemplary embodiment. The method of FIG. 2 may be executed by the system 100 described with reference to FIG. 1 according to an exemplary embodiment.

In FIG. 2, at least one piece of information about at least one object included in an image displayed on the first apparatus 110 is tagged to the image, and the at least one piece of information is automatically tagged to another image stored in at least one of the first apparatus 110, the cloud server 120, and the second apparatus 130.

Figure 3A:
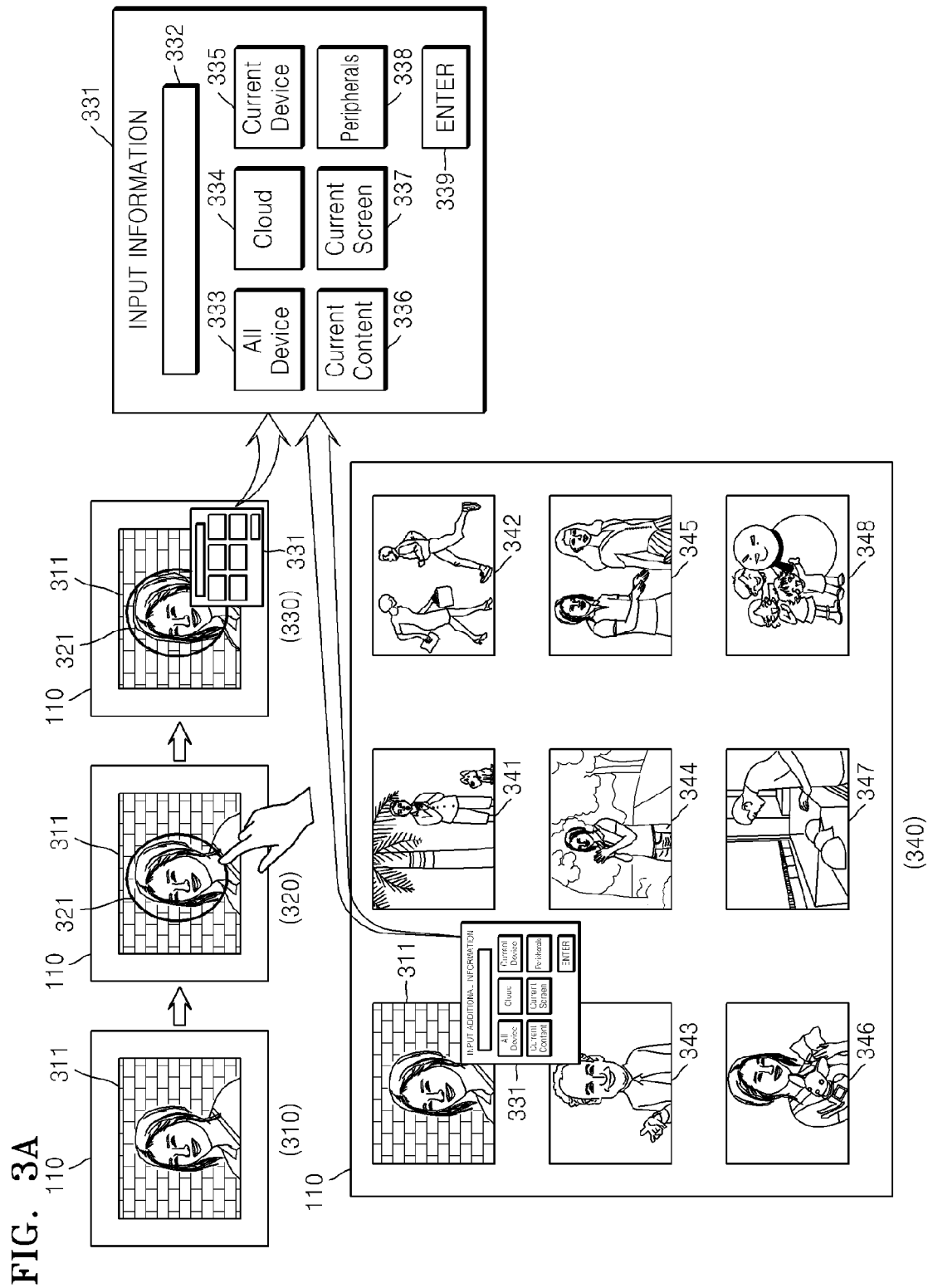
FIG. 3A is a view illustrating exemplary screens for inputting information about an object included in an image, and setting a tagging range, according to an exemplary embodiment.
Figure 3B:
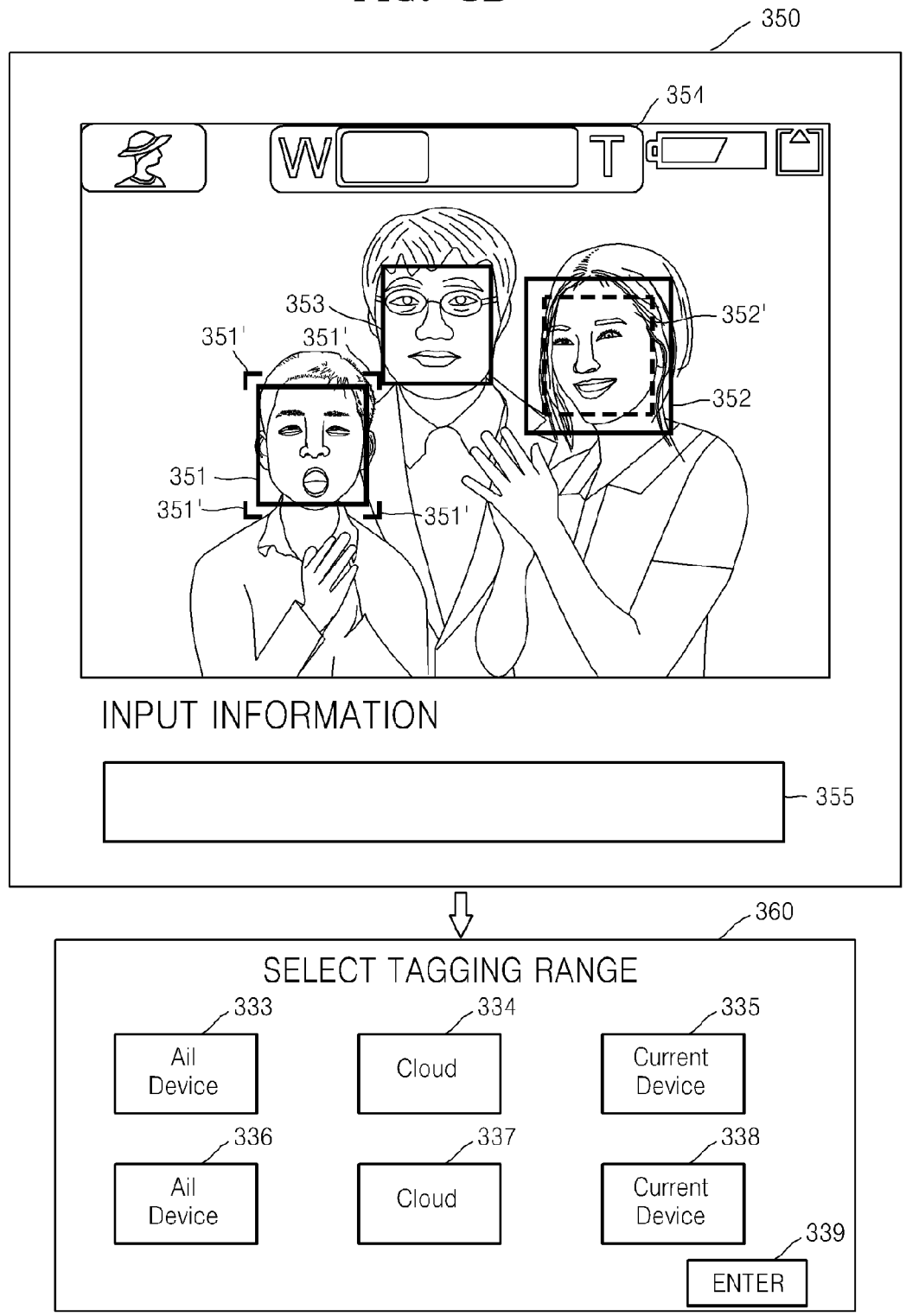
FIG. 3B is a view illustrating exemplary screens for inputting information about an object group including a plurality of objects in an image, and a screen for setting a tagging range, according to an exemplary embodiment.
Figure 4:
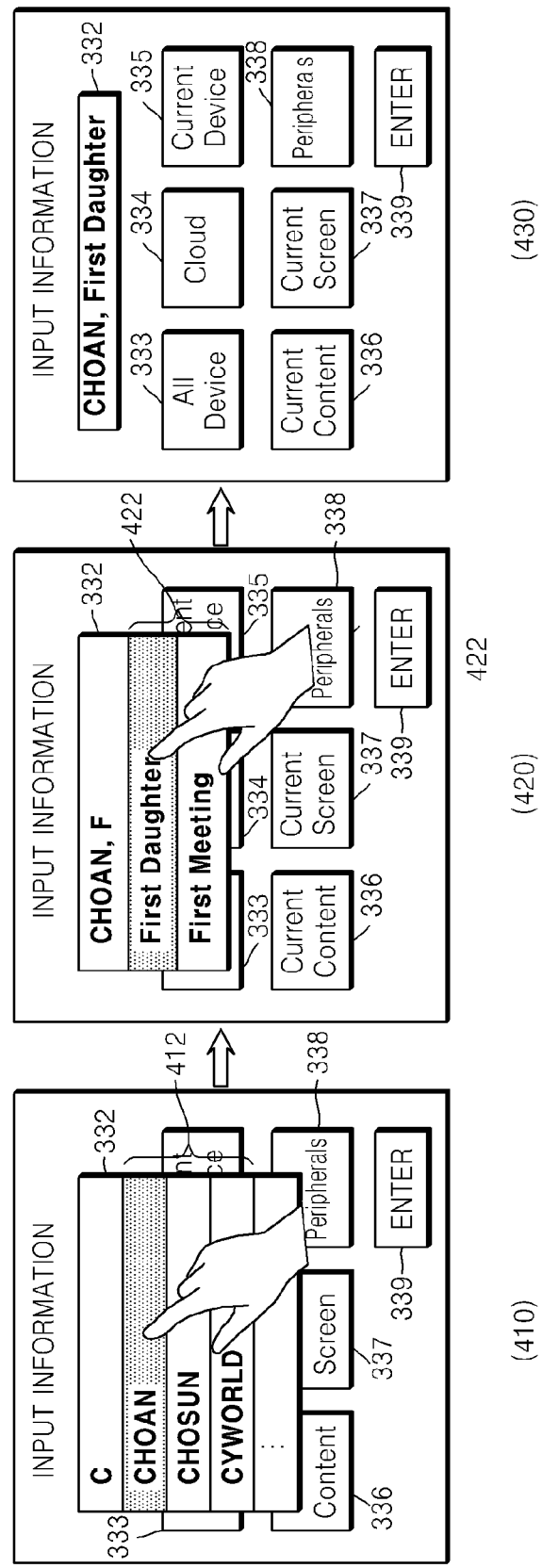
FIG. 4 is a view illustrating exemplary screens for describing a process of inputting information based on an information input window according to an exemplary embodiment.

FIG. 3A is a view illustrating exemplary screens 310 through 340 for inputting information about an object included in an image, and setting a tagging range, according to an exemplary embodiment. FIG. 3B is a view illustrating an exemplary screen 350 for inputting information about an object group including a plurality of objects in an image, and an exemplary screen 360 for setting a tagging range, according to an exemplary embodiment. FIG. 4 is a view illustrating exemplary screens 410 through 430 for describing a process of inputting information based on an information input window such as the information input window 332 depicted in FIG. 3A, according to an exemplary embodiment.

The method of FIG. 2 will now be described in detail with reference to FIGS. 3A, 3B, and 4, according to an exemplary embodiment. The first apparatus 110 displays an image 311 on the screen 310 of FIG. 3, in operation S201. The displayed image 311 may be obtained or generated by the first apparatus 110 or received from the cloud server 120 or the second apparatus 130, but a method of obtaining the image 311 is not limited thereto and is provided by way of an example only. As described above, the image 311 may be a still image, such as a photograph, or an image in a frame unit extracted from a moving image, but it is not limited thereto and is provided by way of an example only. When the image 311 is obtained or generated by the first apparatus 110, the image 311 may be obtained or generated by using a capture function of the first apparatus 110. The capture function of the first apparatus 110 may be performed by a screen capture program, such as a camera program or a snapshot program. When the image 311 is received from the cloud server 120 or the second apparatus 130, the first apparatus 110 may receive the image 311 by transmitting a request signal for the image 311 to the cloud server 120 or the second apparatus 130.

The first apparatus 110 receives a selection signal 321 from a user in which at least one displayed object included in the image 311 is selected, in operation S202. The screen 320 in FIG. 3A is an example of a finger touch-based closed path input by the user. This input is being recognized as the selection signal 321, as shown in FIG. 3A. In other words, in an exemplary embodiment, when the image 311 in the screen 310 of FIG. 3A is displayed on the first apparatus 110, and the finger touch-based closed path is detected, the first apparatus 110 recognizes that the selection signal 321 included in the finger touch-based closed path, is received. However, the selection signal 321 is not limited to a finger touch base described above. In other words, the selection signal 321 may be received via a stylus touch base or a space gesture base. Also, the selection signal 321 is not limited to the closed path shown in the screen 320 of FIG. 3A, but may be expressed in any form. For example, as will be described later with reference to FIG. 17E, according to an exemplary embodiment, a selection signal from a user on a plurality of objects included in a region 1751 may be received by setting the region 1751 on an image being displayed, via touch-and-drag.

FIG. 3B is a view illustrating the screen 350 where an image 354 including a plurality of objects is displayed on the first apparatus 110 according to an exemplary embodiment. A selection signal which indicates a selection of the plurality of objects may be received based on a setting of a region via touch-and-drag, as will be described later with reference to FIG. 17E, according to an exemplar embodiment. However, in an alternative exemplary embodiment, the selection signal of the plurality of objects may be received based on closed paths 351, 352, and 353 having a quadrangular shape, closed paths where four corners of each of the closed paths 351, 352, and 353 are round, or a camera focus region 351' adjacent to the four corners of the closed paths 351, 352, and 353. The selection signal from the user of an object based on the camera focus region 351' may be recognized to be received when, for example, a touch is detected at a predetermined location in the camera focus region 351' including a boundary of the camera focus region 351'.

Referring back to FIG. 3A, upon receiving the selection signal 321 of at least one object, the first apparatus 110 displays an input window for receiving information, in operation S203. The selection signal which includes a selection of a plurality of objects may be received based on a dashed line 352' shown in FIG. 3B by way of an example.

The input window may be displayed by being included in a popup window 331 at a display location adjacent to a selected object, as shown in the screen 330 of FIG. 3A according to an exemplary embodiment.

The popup window 331 of FIG. 3A includes the information input window 332, information about selectable tagging ranges 333 through 338 that will be described in great detail later, and an 'Enter' field 339 that is information indicating enter of an input and selection. The selectable tagging ranges 333 through 338 are information for setting a tagging range. Alternatively, in operation S203, the first apparatus 110 may display a window including the information input window 332 and the 'Enter' field 339 without the selectable tagging ranges 333 through 338. If the window including the information input window 332 and the 'Enter' field 339 are displayed in operation S203, when tagging ranges are to be displayed, a window including the selectable tagging ranges 333 through 338 and the 'Enter' field 339 is displayed on the popup window 331 without the information input window 332. The popup window 331 may be displayed in a multi-window form with the image 311, as shown in FIG. 3A, screen 330. The popup window 331, the information input window 332, the selectable tagging ranges 333 through 338, and the 'Enter' field 339 included in the popup window 331 are exemplary objects of a graphical user interface (GUI).

FIG. 3B illustrates an example of independently displaying an information input window 355 and a window including the selectable tagging ranges 333 through 338 according to an exemplary embodiment. In other words, as shown in FIG. 3B, when the screen 350 including the plurality of objects is displayed on the first apparatus 110 and selection signals based on the closed paths 351, 352, and 353 are received, the first apparatus 110 displays the information input window 355 in operation S203. According to an exemplary embodiment, the selectable tagging range window 360 may be displayed separately as shown in FIG. 3B When the information input window 332 is displayed on the first apparatus 110, as shown in FIG. 3A, and information is input in the information input window 332 in operation S204, the first apparatus 110 tags the input information to an image in operation S205. Predetermined information indicating an intention of the user may be input as the additional information. Alternatively, as shown in FIG. 4, completed information may be displayed whenever one character is input through the information input window 332, and information selected based on the completed information may be input. In other words, in an exemplary embodiment, when one letter is input, predictive words may appear tailored to each user. In an exemplary embodiment, completed information may be predictive words or terms, which may or may not be tailored to a particular user, scene, etc.

In the screen 410 of FIG. 4, when "C" is input into the information input window 332, a completed information window 412 including selectable completed information "CHOAN, CHOSUN, CYWORLD" is additionally displayed, and "CHOAN" is shown in a shaded background indicating that it is being selected as additional information. Then, when a comma (,) is input as shown in FIG. 4, screen 420, and "F" is input as shown in the screen 420 of FIG. 4, a completed information window 422 including selectable completed information "First Daughter, First Meeting" is additionally displayed, and "First Daughter" is shown in a shaded background indicating that it is being selected as additional information. Accordingly, the screen 430 is displayed on the first apparatus 110 in FIG. 4 showing filled in input information window 332.

In FIG. 4, when two pieces of information are input for one object, the two pieces of information are separated from each other by using a comma. Alternatively, the two pieces of information may be separated by leaving at least two spaces. At least two spaces are used so as to be distinguished from information including one space. However, the separating of the two pieces of information is not limited to a comma or at least two spaces. For example, a slash (/) may be used to separate the two pieces of information. Also, at least one piece of information may be input to one object group including a plurality of objects as shown in FIG. 4.

The completed information shown in screen 430 of FIG. 4 may include at least one of information that is input at least once while tagging information to an image, and information pre-stored in the first apparatus 110. The pre-stored information may be updated to include input information.

Referring back to FIG. 3B, the first apparatus 110 may receive at least one piece of information indicating an intention of the user regarding one object group which includes a plurality of objects, through the information input window 355. A plurality of pieces of information may be received from the user regarding one object group, as described with reference to FIGS. 3A and 4, but in an alternative exemplary embodiment, one piece of information may be received. For example, information about a "family" or a "colleague" may be received as additional information.

The tagging of information to the image 311 or 354 displayed on the first apparatus 110 may be performed by adding the information to metadata of the image 311 or 354. For example, the information may be tagged to the image 311 or 354 by inserting the information to an exchangeable image file (EXIF) format of the image 311 or 354. The EXIF format may include date information of when an image is generated, location information, generator information, an image size, and operation condition information of an apparatus that generated an image. If the apparatus that generated the image is a digital camera, operation conditions may include an exposure time, an exposure program, a focal length, an F-number, a shutter speed, and flash information, but they are not limited thereto.

Accordingly, when the image being displayed on the first apparatus 110 is obtained or generated by a digital camera, or a camera function or capture program of the first apparatus 110, the first apparatus 110 tags the information to the EXIF format. Here, in order for the information included in the EXIF format to be used as a search word or a search keyword, a search word exclusive data field may be defined in the EXIF format, and the information may be recorded in the search word exclusive data field or identification information indicating that the information is a search word or search keyword may be included in the EXIF format. However, the metadata of the image is not limited to the EXIF format.

After tagging the information to the image being displayed on the first apparatus 110, the first apparatus 110 displays information about tagging ranges in operation S206. The tagging ranges may include "All Devices" as the selectable tagging range 333, "Cloud" as the selectable tagging range 334, "Current Device" as the selectable tagging range 335, "Current Content" as the selectable tagging range 336, "Current Screen" as the selectable tagging range 337, and "Peripherals" as the selectable tagging range 338, as shown in the popup window 331 of FIG. 3A or the screen 360 of FIG. 3B, according to exemplary embodiments, but they are not limited thereto. The popup window 331 of FIG. 3A is an example of displaying the information input window 332 and the selectable tagging ranges 333 through 338 together, and FIG. 3B illustrates an example of independently displaying the information input window 355 and the selectable tagging ranges 333 through 338 in a separate window 360, according to exemplary embodiments.

The "All Devices" 333 is used to set images stored in all apparatuses connected to the first apparatus 110 as tagging ranges i.e., images that will be tagged with the input information if the tagged object is found in the images. For example, when the cloud server 120 and the second apparatus 130 are connected to the first apparatus 110, images stored in the first apparatus 110, the cloud server 120, and the second apparatus 130 are included in tagging ranges. However, when only the cloud server 120 is connected to the first apparatus 110, images stored in the first apparatus 110 and the cloud server 120 are included in tagging ranges.

The "Cloud" 334 is used to set images stored in the cloud server 120 connected to the first apparatus 110 as tagging ranges. When there is a plurality of the cloud servers 120, images stored in the plurality of cloud servers 120 are included in tagging ranges. The "Current Device" 335 is used to set images stored in the first apparatus 110 as tagging ranges. The "Current Content" 336 is used to set an image being displayed on the first apparatus 110 in operation S201 as a tagging range. The "Current Screen" 337 is used to set another image displayed with the image being displayed on the first apparatus 110 in operation S201 as a tagging range. For example, when a tagging range is selected by "Current Screen" 337, the image displayed on the first apparatus 110 in operation S201 may be the images displayed on the screen 340 of FIG. 3A, and an object selected by the user is included in the image 311, and images 341 through 348 may be included in tagging ranges. That is, in an exemplary embodiment, the images 341 and 348 are the tagging range where each of these images will be examined to determine if the feature object 321 is present therein. The "Peripheral" 338 is used to set images stored in a peripheral apparatus connected to the first apparatus 110 as tagging ranges.

When the selectable tagging ranges are displayed and then a selection signal to select a tagging range is input by the user in operation S207, as shown in the popup window 331 of FIG. 3A or the screen 360 of FIG. 3B, according to exemplary embodiments, the first apparatus 110 detects another image based on the tagging range determined based on the selection signal, and automatically tags the information to the other detected image, in operations S208 through S215.

The other image is an image including the object selected in operation S202. Thus, the other image may be detected based on a feature value of the selected object, but it is not limited thereto but is merely an example. The feature value may be expressed as a numerical value obtained by using at least one of a face recognition technology, an object recognition technology, a contour detection technology, a feature point detection technology, and a character recognition technology after detecting a face region, but it is not limited thereto but is merely an example.

In an exemplary embodiment, the user may tag an object appearing in one image and add a description via an input information window 332 and then select the tagging range for searching for the object e.g., current screen 337. The images in the selected tagging range (images 311 and 341-348) are searched and each of the images in the selected tagging range which include the object is also tagged with the same description. In an exemplary embodiment depicted in FIG. 3A, images 344-346 are also tagged with the input information 332 because they depict the selected face 321.

For example, the first apparatus 110 determines whether the object selected in operation S202 includes a face of a person by extracting a face region according to an exemplary embodiment. When it is determined that the selected object includes the face, the first apparatus 110 detects a feature value expressed as a numerical value on the face region by performing a face recognition operation based on a principle component analysis (PCA). The first apparatus 110 stores the detected feature value and uses the detected feature value to detect the face in the other image.

Alternatively, in an exemplary embodiment, when it is determined that the selected object does not include the face, the first apparatus 110 detects a feature value expressed as a numerical value of the object by using at least one of the contour detection technology, the object recognition technology, the feature point detection technology, and the character recognition technology. The first apparatus 110 stores the detected feature value, and uses the stored detected feature value to detect the other image including a feature value corresponding to the detected feature value.

The detecting and storing of the feature value may be performed at any time after the operation S202 and before the operations S208, 211, and 214. In an alternative exemplary embodiment, the first apparatus 110 may detect and store the feature value while detecting the object included in the image displayed on the first apparatus 110, while displaying the image on the first apparatus 110 in operation S201.

The feature or a tagged element in the other image may be detected by using at least one of a face recognition technology and matching technology, an object recognition technology and matching technology, a character recognition technology and matching technology, a contour detection technology and matching technology, and a feature point detection technology and matching technology. For example, a feature point of an object included in a first image is detected by using a face recognition technology. Then, the feature point of the object included in the first image and a feature point of an object selected from the displayed image are compared by using a matching technology. When a difference thereof is lower than or equal to a predetermined threshold value, the first image is detected as the other image including an object similar to the object selected from the displayed image. The first image is one image included in a tagging range set by the user.

In an exemplary embodiment, a technology to be used from among the above technologies to detect the feature or element in the other image may be pre-set in the first apparatus 110. The feature value may further include information about whether the object includes a face of a person. If the feature value further includes such information, it is determined whether the first image includes the face by using a face region extraction technology. If the first image does not include the face, the first image is excluded from a target for detecting the feature or element so that a process for detecting a feature value of an object included in the first image is no longer performed. However, if the first image includes the face, the face recognition technology is used to detect a feature value expressed as a numerical value on the object included in the first image. Then, it is determined whether an error value between the feature value of the object included in the first image and the feature value of the object selected from the image displayed on the first apparatus 110 in operation S201 is within a threshold range by using a matching technology. The determining of whether the error value is within the threshold range may be understood to be determining whether a difference between the two feature values is lower than or equal to a threshold value. When the error value is within the threshold range, the first apparatus 110 detects the first image as the other image which includes the selected object. However, when the error value is not within the threshold range, the first apparatus 110 excludes the first image as a target image for detecting the selected object.

When the feature value of the selected object includes information indicating that the face is not included, the first apparatus 110 uses a face region extraction technology to determine whether the first image includes the face. If the first image includes the face, the first apparatus 110 excludes the first image as a target for detecting the selected object. However, if the first image does not include the face, the first apparatus 110 may detect a feature value expressed as a numerical value on an object included in the first image by using a contour detection technology and matching technology, a feature point detection technology and matching technology, an object recognition technology and matching technology, or a character recognition technology and matching technology. The first apparatus 110 determines whether the error value between the feature value of the object included in the first image and the feature value of the object selected from the displayed image is within the threshold range. If the error value is within the threshold range, the first apparatus 110 detects the first image as the other image which includes the selected object. Otherwise, if the error value is not within the threshold range, the first apparatus 110 excludes the first image as a target for detecting the object or element of interest.

A method of detecting the feature value of the object selected from the displayed image and a method of detecting the other image are not limited to the ones above but provided by way of an example only. For example, selecting of a technology from among the face recognition technology, the contour detection technology, the feature point detection technology, the object recognition technology, and the character recognition technology to be used is not performed based on whether the object includes the face, but may be performed based on any one of various standards, for example, whether the object includes a thing, an animal, or an insect. Also, a technology for detecting the feature value is not limited to those described above as those technologies are provided by way of an example only. As such, the feature value of the object selected from the image displayed on the first apparatus 110 may include information according to the above standards. In other words, the feature value may include information indicating whether the object includes a thing, an animal, or an insect. A method of detecting the other image which includes the feature or element of interest may be performed based on a standard pre-determined in an apparatus for detecting the other image which includes the feature or element of interest. The feature or element of interest included in the other image may be related to the selected object.

The detecting of the other image with the element or feature of interest based on the face recognition technology and matching technology may be referred to as detecting of the other image including an object having a face print similar or corresponding to a face print of the object selected in operation S202. A face print includes numerical values, such as a distance between the eyes, a thickness of a nose, a height and shape of a cheekbone, and an area and height of a forehead, but it is not limited thereto and is provided by way of an example.

The detecting of the other image with the feature or element of interest is based on the object recognition technology and matching technology may be referred to as detecting of the other image including an object similar to or matching a type, size, direction, and location of the object selected in operation S202.

The detecting of the other image based on the character recognition technology and matching technology may be referred to as detecting of the other image including a character similar to a character stroke obtained by connecting to edge information of the object selected in operation S202.

The detecting of the other image based on the contour detection technology and matching technology may be referred to as detecting of the other image including a contour similar to a contour expressed in a shape, size, or pattern of a surface of the object selected in operation S202.

The detecting of the other image based on the feature point detecting technology and matching technology may be referred to as detecting of the other image including an object having a feature point similar to the feature point used to express the object selected in operation S202. The feature point may be detected by using a curvature method using an angle or a strip method using a distance, but it is not limited thereto and is provided by way of an example.

The other image includes the at least one object selected in operation S202. In other words, when one object is selected in operation S202 and information is tagged to the selected object, the other image includes the object selected in operation S202. If a plurality of objects are selected in operation S202, the objects are grouped into one object group, and information is tagged to the object group, the other image includes the plurality of objects selected in operation S202. Here, locations of the objects included in the image displayed in operation S201 may be different from locations of the objects included in the other image.

When the selected tagging range is based on "All Devices" 333 as shown in FIG. 3A, and the first apparatus 110 is connected to the cloud server 120 and the second apparatus 130, the first apparatus 110 may detect the other image with the element or feature of interest as described above in each of the first apparatus 110, the cloud server 120, and the second apparatus 130, and automatically tags the information to the other detected image in operations S208 through S215.

When the selected tagging range is based on "Cloud" 334 as shown in FIG. 3A, and the first apparatus 110 is connected to the cloud server 120, the first apparatus 110 transmits an automatic tagging request signal to the cloud server 120 in operations S210 through S212. The automatic tagging request signal may include the information input in operation S204 and the feature value of the object selected in operation S202. Alternatively, in an exemplary embodiment, the automatic tagging request signal may be independently transmitted from the information and the feature value. Image information of the selected object may be transmitted to the cloud server 120, instead of the feature value. When the image information is transmitted to the cloud server 120, the cloud server 120 may detect the feature value of the image information as described above by way of an example and detect the other image by using the detected feature value, in order to detect the other image including the image information. For example, when a feature point detection technology is used to detect the other image, the cloud server 120 may detect the other image by detecting feature point information of the image information.

When the selected tagging range is "Peripherals" 338 as shown in FIG. 3A, and the first apparatus 110 is connected to the second apparatus 130, the first apparatus 110 may transmit an automatic tagging request signal to the second apparatus 130 in operations S213 through S215. Accordingly, the second apparatus 130 detects the other image including the object selected in operation S202, and tags the information received from the user in operation S204 to the other image. The detecting of the other image may be performed as described above by way of an example and not by way of a limitation.

When the tagging range selected in operation S207 is "Current Screen" 337, the first apparatus 110 detects the other image in the tagging range based on, for example, the images 341 through 348 included in the screen 340 of FIG. 3A in operation S208. In the screen 340 of FIG. 3A, the first apparatus 110 detects the images 344, 345, and 346 as other images which contain the object of interest, as described above. The images 344 through 346 are images including the object of the image 311 according to the selection signal 321 in an exemplary embodiment. Accordingly, in operation S209, the first apparatus 110 automatically tags the information received from the user in operation S204 to the images 344 through 346.

Figure 5:
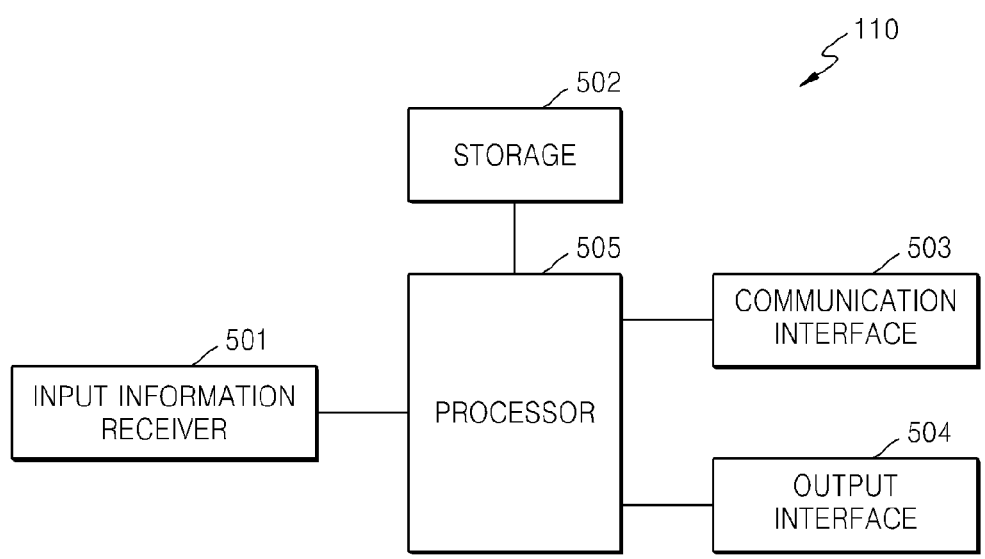
FIG. 5 is a block diagram illustrating a first apparatus according to an exemplary embodiment.

FIG. 5 is a block diagram illustrating the first apparatus 110 according to an exemplary embodiment. Referring to FIG. 5, the first apparatus 110 includes an input information receiver 501, a storage 502, the communication interface 503, an output interface 504, and a processor 505.

The input information receiver 501 receives input information of the user. Thus, the input information receiver 501 is configured to receive a signal dependent upon a touch-based gesture, voice recognition, face recognition, a text and image expressed by using a touch tool, a physical button control, or information transmitted from a remote controller (not shown).

Accordingly, the input information receiver 501 may include a touch screen, an audio signal input unit, such as a microphone, a camera, a physical button, or a remote signal receiver based on wireless communication. The remote signal receiver may be configured in the same or a similar manner as a wireless communication unit 801 of FIG. 8 that is described later.

The storage 502 stores at least one application, an information tagging program, an image search program, and information required for tagging information and searching for an image. Also, the storage 502 may store at least one program and/or command set and resources configured to be executable in the processor 505 described below. In an exemplary embodiment, the storage 502 may also store images of the first apparatus 110.

The at least one program stored in the storage 502 includes at least one program required to perform a method of tagging information about an image and searching for an image, according to an exemplary embodiment, an operating system (OS) program of the first apparatus 110, an application program related to various functions performed in the first apparatus 110, and a program for driving hardware components included in the first apparatus 110.

The resources stored in the storage 502 include cloud account information for connecting to at least one cloud server 120, according to an exemplary embodiment. The cloud account information may be pre-set in the first apparatus 110 or input by a user into the first apparatus 110.

Alternatively, in an exemplary embodiment, the resources stored in the storage 502 may include user information which operates the first apparatus 110, information required to operate an application program set in the first apparatus 110, and information required to execute a program required to drive the hardware components.

The storage 502 may independently include a storage part which is configured to store at least one program for driving each component included in the first apparatus 110, as well as the OS program, and a storage part which is configured to store the application programs and at least one program and resources for executing the method according to an exemplary embodiment.

The storage 502 may include a non-volatile memory, such as high-speed random access memory, a magnetic disk storage apparatus, or a flash memory, or a non-volatile semiconductor memory. Accordingly, the storage 502 may be referred to as a memory. The at least one program and/or command set stored in the storage 502 may be divided into a plurality of modules according to functions in an exemplary embodiment.

Figure 6:
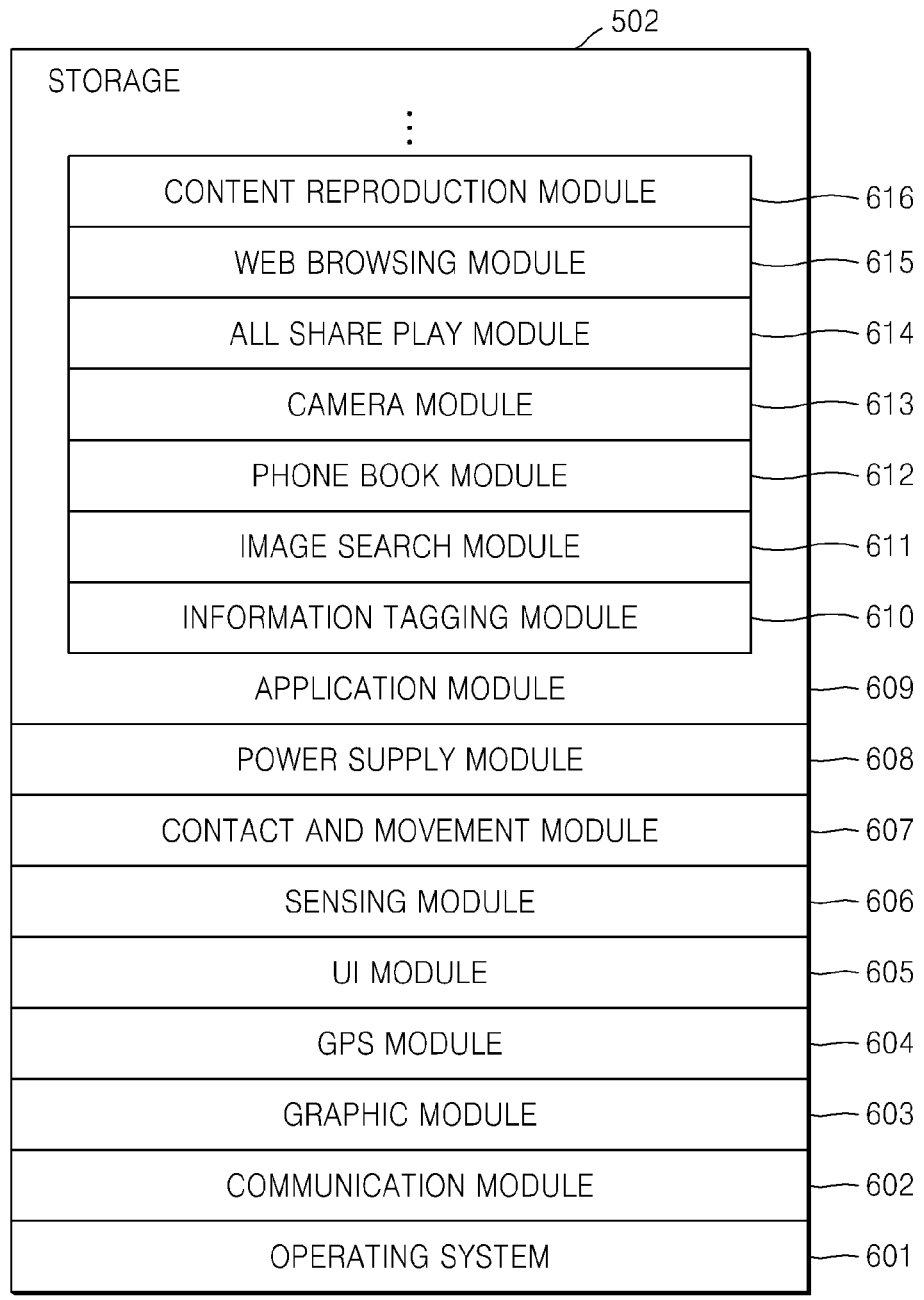
FIG. 6 is a view illustrating a table of a program and/or command set stored in a storage unit according to an exemplary embodiment.

FIG. 6 is a view illustrating a table of a program and/or command set according to an exemplary embodiment. The table shown in FIG. 6 may be stored in the storage 502 and includes the program and/or command set which are classified according to modules. Referring to FIG. 6, the storage 502 may include an OS 601, a communication module 602, a graphic module 603, a global positioning system (GPS) module 604, a user interface (UI) module 605, a sensing module 606, a contact and movement module 607, a power supply module 608, and an application module 609, but it is not limited thereto and is provided by way of an example only.

The application module 609 includes an information tagging module 610, an image search module 611, a phone book module 612, a camera module 613, an all share play module 614, a web browsing module 615, and a content reproduction module 616, but it is not limited thereto and is provided by way of an example only. The information tagging module 610 and the image search module 611 may be configured as one module according to an exemplary embodiment.

The OS 601 controls and manages general functions of the first apparatus 110, and includes a software component enabling a communication between hardware and software components in the first apparatus 110 according to an exemplary embodiment.

The communication module 602 enables a communication between the cloud server 120 and the second apparatus 130 through the communication interface 503 according to an exemplary embodiment. The communication module 602 includes a software component for processing data received from the cloud server 120 and the second apparatus 130, and data transmitted from the cloud server 120 and the second apparatus 130, through the communication interface 503. The transmitted and received data may include cloud account authentication and an information tagging request signal on an image.

Also, the communication module 602 according to an exemplary embodiment includes a software component enabling a communication between the cloud server 120, the second apparatus 130, and the first apparatus 110 such that an information tagging and image search application, or an image is downloaded from the could server 120 and the second apparatus 130, or applications stored in the cloud server 120 and the second apparatus 130 are controlled by the first apparatus 110.

When the information tagging module 610 is executed in the first apparatus 110 according to an exemplary embodiment, the communication module 602 may transmit an automatic tagging request signal to the cloud server 120 and the second apparatus 130 through the communication interface 503. Also, when the image search module 611 is executed, information based on an object may be transmitted to the cloud server 120 and the second apparatus 130 as a search keyword.

The graphic module 603 includes a software component for adjusting and rendering a brightness of a graphic displayed on the output interface 504, and a software component for providing a virtual keyboard (or a soft keyboard) for inputting text in the application module 609, according to an exemplary embodiment.

The GPS module 604 includes a software component for determining a location of the first apparatus 110, and providing the determined location to an application providing GPS, according to an exemplary embodiment.

The UI module 605 includes a software component for providing a required UI to the application module 609 providing UI information based on the input information receiver 501 and the output interface 504, according to an exemplary embodiment.

The sensing module 606 includes a software component for determining sensing information based on the input information receiver 501, and providing the determined sensing information to the application module 609 providing a service based on the sensing information, according to an exemplary embodiment.

The contact and movement module 607 includes a software component for detecting a touch based on the input information receiver 501, and providing the detected touch to the application module 609 by tracking movement based on the touch, according to an exemplary embodiment.

The power supply module 608 includes a software component for controlling power supply to a hardware component in the first apparatus 110 by engaging with the OS 601, and controlling a sleep mode of power supplied to the output interface 504, according to an exemplary embodiment.

Since functions of modules included in the application module 609 may be intuitively understood by one of ordinary skill in the art based on their names, modules related to an exemplary embodiment will be mainly described.

For example, when an information tagging start request signal is received through the input information receiver 501 of the first apparatus 110, the first apparatus 110 starts an operation of the information tagging module 610 on an image stored in the storage 502 according to an exemplary embodiment.

Accordingly, the information tagging module 610 tags information about at least one object included in an image to the image, as described above with reference to FIG. 2 by way of an example, detects another image including the at least one object, and automatically tags the information to the other image.

Also, when an image search request signal is received through the input information receiver 501 of the first apparatus 110, the first apparatus 110 starts an operation of the image search module 611 on the image stored in the storage 502 according to an exemplary embodiment.

Information about the location of the first apparatus 110 is provided from the GPS module 604 according to an exemplary embodiment.

The communication interface 503 may transmit or receive data to or from the cloud server 120 and the second apparatus 130 through the network 140 using a wireless network, such as wireless Internet, a wireless intranet, a wireless phone network, a wireless local area network (LAN), a Wi-Fi network, a Wi-Fi direct (WFD) network, a 3rd generation (3G) network, a 4G long term evolution (LTE) network, a Bluetooth network, an infrared data association (IrDA) network, an RFID network, an ultra wideband (UWB) network, or a Zigbee network, or a wired network, such as wired Internet or a phoneline networking alliance (PNA). The network 140 of FIG. 1 may be defined to be a wired network or a wireless network based on the communication interface 503, according to an exemplary embodiment.

The communication interface 503 may include at least one of a broadcast receiving module, a mobile communication module, a wireless Internet module, a wired Internet module, a short-range communication module, and a location information module, but it is not limited thereto but is provided by way of an example only.

The broadcast receiving module receives a broadcast signal and/or broadcast-related information from an external broadcast management server (not shown) through a broadcast channel, according to an exemplary embodiment. Examples of the broadcast channel include a satellite channel, a terrestrial channel, and a cable channel. The mobile communication module transmits or receives a wireless signal to or from a base station (not shown), the cloud server 102 and the second apparatus 130 via a mobile communication network. Examples of the wireless signal include a voice signal, an image call signal, and data having various forms according to transmission and reception of texts/multimedia messages.

The wireless Internet module is a module for a wireless Internet connection according to an exemplary embodiment. The wired Internet module is a module for a wired Internet connection. The short-range communication module is a module for a short-range communication according to an exemplary embodiment. A short-range communication technology may use a Bluetooth network, an RFID network, an IrDA network, an UWB network, a Zigbee network, a WFD network, or an NFC network.

The location information module is a module for checking or obtaining the location of the first apparatus 110 according to an exemplary embodiment. For example, a GPS-based location information module may be used. The GPS-based location information module receives location information from a plurality of satellites. The location information may include coordinate information expressed in longitude and latitude.

The output interface 504 outputs a UI object according to input information, and information according to execution of the information tagging program and the image search program, according to an exemplary embodiment. The output interface 504 may include a display function and an audio signal output function. The output interface 504 may be integrally formed with the input information receiver 501. When the output interface 504 and the input information receiver 501 are integrally formed, such a component may be referred to as an input and output interface.

The output interface 504 may include a liquid crystal display, a thin film transistor-liquid crystal display, an organic light-emitting diode display, a flexible display, a 3D display, or an active-matrix organic light-emitting diode (AMOLED) display, but it is not limited thereto and is provided by way of an example only. Two or more output interfaces 504 may be included according to a structure of the first apparatus 110.

The processor 505 controls an overall operation of the first apparatus 110, and may include one or more processors according to an exemplary embodiment. The processor 505 may include one or more processors though the processor 505 is in a single chip in FIG. 5, and thus the processor 505 may be divided into a plurality of processors according to functions of the first apparatus 110.

The processor 505 may control the input information receiver 501, the storage 502, the communication interface 503, and the output interface 504 by using the OS 601 and the various modules 602 through 616 stored in the storage 502. Accordingly, the processor 505 may be a controller, a microprocessor, or a digital signal processor. Also, the processor 505 may provide a UI by using the input information receiver 501 and the output interface 504 through the OS 601 and the UI module 605.

The processor 505 may perform the method of FIG. 2 by executing at least one program related to a method of tagging information about an image, according to an exemplary embodiment. The processor 505 may execute the at least one program by reading the at least one program from the storage 502 or downloading the at least one program from the cloud server 120 or a server (not shown) connected to the communication interface 503.

The processor 505 may execute at least one program related to a method of tagging information about an image, according to an exemplary embodiment, stored in the cloud server 120 and the second apparatus 130, and tag information to images that include an object selected by the user and are stored in the cloud server 120 and the second apparatus 130.

The processor 505 may include an interface function element for interfacing between various hardware components in the first apparatus 110 and the processor 505.

Figure 7:
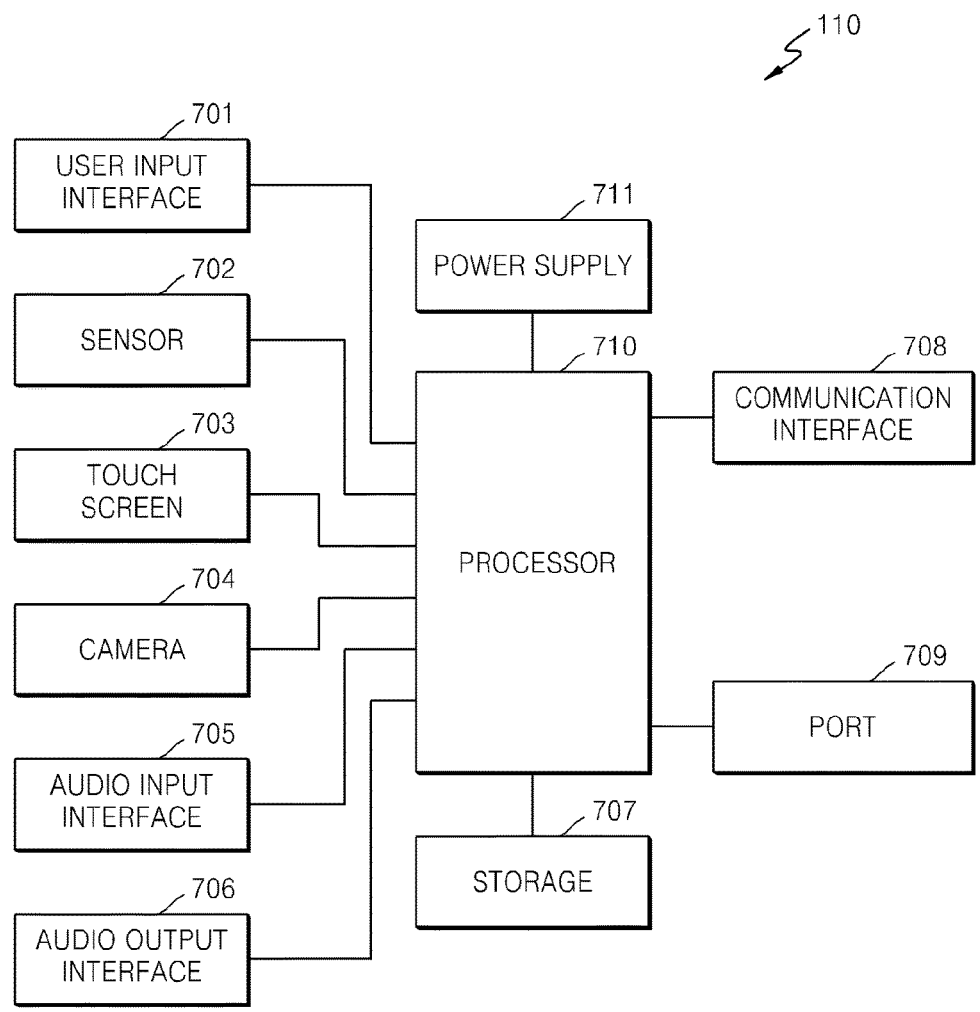
FIG. 7 is a block diagram illustrating the first apparatus according to another exemplary embodiment.

FIG. 7 is a block diagram illustrating the first apparatus 110 according to another exemplary embodiment. Referring to FIG. 7, the first apparatus 110 includes a user input interface 701, a sensor 702, a touch screen 703, a camera 704, an audio input interface 705, an audio output interface 706, a storage 707, a communication interface 708, a port 709, a processor 710, and a power supply 711. However, components included in the first apparatus 110 are not limited thereto and are provided by way of an example only.

The user input interface 701 generates input data (or control data) and the input information provided from the user so as to control operations of the first apparatus 110, according to an exemplary embodiment. The user input interface 701 may include a keypad, a dome switch, a touch pad instead of a mouse, a jog wheel, a jog switch, or a hardware button.

The sensor 702 generates a sensing signal for controlling operations of the first apparatus 110 by detecting a current state of the first apparatus 110, such as the location of the first apparatus 110, a contact of the user, an orientation of the first apparatus 110, or acceleration or deceleration of the first apparatus 110, according to an exemplary embodiment. The sensor 702 may include a proximity sensor and the motion sensor described above. Accordingly, the sensor 702 may generate a signal that corresponds to recognizing a sensor-based gesture of the user.

The proximity sensor is a sensor for detecting an object approaching or near a predetermined detection surface by using force of an electromagnetic field or infrared light without mechanical contact. Examples of the proximity sensor include a transmission photoelectric sensor, a direct reflection photoelectric sensor, a mirror emission photoelectric sensor, a high frequency oscillation proximity sensor, a capacitance proximity sensor, a magnetic proximity sensor, and an infrared proximity sensor. These exemplary sensors are provided as examples and not by way of a limitation.

Input information based on the touch screen 703 may be generated according to a request or selection of the user that is dependent upon the gesture of the user. The gesture may be variously defined as described above, according to various combinations of a touch number, a touch pattern, a touch area, and touch intensity. A finger-based touch on the touch screen 703 may be based on any body part of the user that is capable of touching a touch region of the touch screen 703.

The touch screen 703 may include any one of various sensors for detecting a touch or proximity touch on the touch screen 703 by way of an example. A sensor included in the touch screen 703 may detect a gesture or pattern on the touch screen 703. Accordingly, the touch screen 703 may generate a signal obtained by sensing the gesture or pattern based on the proximity sensor, such as touch-based drag, flick, tap, touch-and-hold, double tap, panning, or sweep. The proximity sensor of the touch screen 703 may be the same as a proximity sensor included in the sensing unit 702.

An example of the sensor for detecting a touch on the touch screen 703 includes a tactile sensor. The tactile sensor may detect various type of information, such as the roughness of a contact surface, the hardness of a contact object, and a temperature at a contact point. A touch on the touch screen 703 may be detected as a pointer touches a panel. The touch may be a multi-touch. The multi-touch may be generated so as to select a plurality of objects as will be described later with reference to FIG. 17D by way of an example. According to a proximity touch on the touch screen 703, the pointer does not actually touch the touch screen 703 but approaches the touch screen 703 within a predetermined distance. The pointer is a tool for touching or proximity touching a certain region of the touch screen 703. Examples of the pointer include a stylus pen, a finger, a body part functioning as the finger, or a tool functioning as the finger. Thus, the pointer may be referred to as an external input device.

The touch screen 703 outputs information processed in the first apparatus 110. For example, the touch screen 703 displays a screen in response to the gesture or pattern of the user that is sensed through a sensor included in the touch screen 703, the control data or input information input through the user input unit 701, or a signal detected through the sensing unit 702.

The touch screen 703 may be an input and output device, according to an exemplary embodiment. When the touch screen 703 is an input and output device, a screen displayed on the touch screen 703 may include a UI screen, a UI object, a GUI screen, or a GUI object. The touch screen 703 may display any screen described or that will be described with reference to FIGS. 3A, 3B, 4, 14, and 17A through 17F, and receive the input information, according to an exemplary embodiment.

The touch screen 703 may include a liquid crystal display, a thin film transistor-liquid crystal display, an organic light-emitting diode display, a flexible display, a 3D display, or an AMOLED display, but it is not limited thereto. The touch screen 703 may be referred to as a display, according to an exemplary embodiment. Two or more touch screens 703 may be included according to a structure of the first apparatus 110, according to an exemplary embodiment.

The camera 704 processes a still image or an image frame of a moving image obtained through an image sensor (or an optical sensor) in an image call mode or a photographing mode. The processed image frame may be displayed on the touch screen 703. The image frame processed by the camera 704 may be stored in the storage 707 or externally transmitted through the communication interface 708 or the port 709, according to an exemplary embodiment.

Two or more cameras 704 may be included according to a structure of the first apparatus 110, according to an exemplary embodiment. Also, the camera 704 may be used as an input device for recognizing a space gesture of the user. The image frame obtained by the camera 704 may be a face image for authenticating the user of the first apparatus 110.

The audio input interface 705 may receive an external sound signal in a call mode, a recording mode, or a voice recognition mode, convert the external sound signal to electric voice data, and transmit the electric voice data to the processor 710, according to an exemplary embodiment. The audio input interface 705 may include a microphone by way of an example. The audio input interface 705 may be configured to include various noise removing algorithms to remove noise generated while receiving the external sound signal.

The external sound signal input to the audio input interface 705 may be a voice signal of the user based on a natural language. For example, an information tagging request command or an image search request command may be input through the audio input interface 705. When the information tagging request command is input through the audio input interface 705, the processor 710 may start to drive the information tagging module 610, an example of which was described above with reference to FIG. 6. When the image search request command is input through the audio input interface 705, the processor 710 may start to drive the image search module 611, an example of which was described above with reference to FIG. 6. The external sound signal may be the voice signal based on the natural language, which means that the external sound signal is input information based on voice recognition. The external sound signal input through the audio input interface 705 may be stored in the storage 707 or externally transmitted through the communication interface 708 or the port 709, according to an exemplary embodiment.

The user input interface 701, the sensor 702, the touch screen 703, the camera 704, and the audio input interface 705 may be referred to as an information input interface or an information input and output interface, according to an interface function between the first apparatus 110 and the user, in an exemplary embodiment. For example, when the interface function between the first apparatus 110 and the user includes a touch recognition function, a voice recognition function, and a space gesture recognition function, the user input interface 701, the sensor 702, the camera 704, and the audio input interface 705 may be referred to as an information input interface, and the touch screen 703 may be referred to as an information input and output interface.

The audio output interface 706 outputs a sound or audio signal received from outside the first apparatus 110 in a call mode or an audio reproduction mode, according to an exemplary embodiment. The audio output interface 706 may include a speaker. When an audio signal is generated while executing an application, the audio output interface 706 outputs the generated audio signal. The audio input interface 705 and the audio output interface 706 may be integrally formed, such as a headset.

The communication interface 708 may transmit or receive data to or from the cloud server 120 and the second apparatus 130, through a wireless network, such as wireless Internet, a wireless intranet, a wireless phone network, a wireless LAN network, a Wi-Fi network, a WFD network, a 3G network, a 4G LTE network, a Bluetooth network, an IrDA network, an RFID network, a UWB network, or a Zigbee network, or a wired network, such as wired Internet or a home PNA network.

The communication interface 708 may include at least one of the broadcast receiving module, the mobile communication module, the wireless Internet module, the wired Internet module, the short-range communication module, and the location information module described above with reference to the communication interface 503, but it is not limited thereto and is provided by way of an example only.

The port 709 may externally transmit and receive data by using a plug-and-play interface, such as a universal serial bus (USB) port (not shown), according to an exemplary embodiment. The plug-and-play interface is a module that is automatically played as an external apparatus (not shown) is inserted into a plug of the first apparatus 110. The external apparatus may include the second apparatus 130 of FIG. 1.

The power supply 711 supplies power to a hardware component included in the first apparatus 110, according to an exemplary embodiment. The power supply 711 includes at least one power supply, such as a battery or alternating current (AC) power. The first apparatus 110 may not include the power supply 711, but may include a connector (not shown) connectable to an external power provider (not shown).

The processor 710 may control an overall operation of the first apparatus 110 and may include one or more processors, according to an exemplary embodiment. The processor 710 may include one or more processors since, although the processor 710 is shown in a single chip form, the processor 710 may be divided into a plurality of processors according to functions of the first apparatus 110.

The processor 710 may control the user input interface 701, the sensor 702, the touch screen 703, the camera 704, the audio input interface 705, the audio output interface 706, the storage 707, the communication interface 708, the port 709, and the power supply 711 by using an OS and various modules stored in the storage 707, according to an exemplary embodiment. The OS and the various modules may respectively correspond to the OS 601 and the modules 602 through 616 of FIG. 6, according to an exemplary embodiment. The processor 710 may be a controller, a microprocessor, or a digital signal processor. Also, the processor 710 may provide a UI by using the user input interface 701, the sensor 702, the touch screen 703, the camera 704, and the audio input interface 705 through the OS and a UI module stored in the storage 707.

The processor 710 may perform any method described with reference to FIG. 2 or that will be described with reference to FIG. 13 by executing at least one program related to a method of tagging information about an image and searching for an image, according to an exemplary embodiment. The processor 710 may execute a program for performing the method by reading the program from the storage 707 or downloading the program from at least one of the cloud server 120 and the second apparatus 130, or a program providing server (not shown) connected through the communication interface 708.

Alternatively, in an exemplary embodiment, the processor 710 may be configured to use a program for performing a method of tagging information about an image stored in at least one of the cloud server 120 and the second apparatus 130, and searching for an image. In other words, the processor 710 requests using the communication interface 708 to drive the program. The processor 710 requests for image information about a selected object, input information, and tagging range information to the cloud server 120 and the second apparatus 130 using the communication interface 708 while requesting the cloud server 120 and the second apparatus 130 to tag the information to an image including the selected object, according to an exemplary embodiment. The image including the object is an image including the image from among all images in a range set by the tagging range information. Thus, there may be a plurality of images which include the object, according to an exemplary embodiment.

Upon receiving the information tagging request, the cloud server 120 or the second apparatus 130 tags the information to the image. The processor 710 may send a request for a search word available during a search, to at least one of the cloud server 120 and the second apparatus 130 using the communication interface 708 based on the input information. The search word provided from at least one of the cloud server 120 and the second apparatus 130 may include the information. There may be a plurality of pieces of information included in the search word. The processor 710 may request to search for an image using the communication interface 708 according to the input information based on the information including the search word. Accordingly, the cloud server 120 and the second apparatus 130 may search for an image by using the tagging range information and the search word based on the information, and may transmit the image to the first apparatus 110 through the communication interface 708. Accordingly, the image may be displayed on the touch screen 703.

As described above, the processor 710 executes at least one program related to the method and stored in the cloud server 120 and the second apparatus 130, and may tag information to an image or search for an image in the cloud server 120 based on a communication between the processor 710 and the cloud server 120, or in the second apparatus 130 based on a communication between the processor 710 and the second apparatus 130, according to various exemplary embodiments. As such, when the information is tagged to the image or the image is searched for by executing the program stored in the cloud server 120 and the second apparatus 130, a program and the resources stored in the storage 707 may be defined to include a program and resources capable of executing the programs stored in the cloud server 120 and the second apparatus 130. The processor 710 may include an interface functional unit for an interface between various hardware components in the first apparatus 110 and the processor 710.

Figure 8:
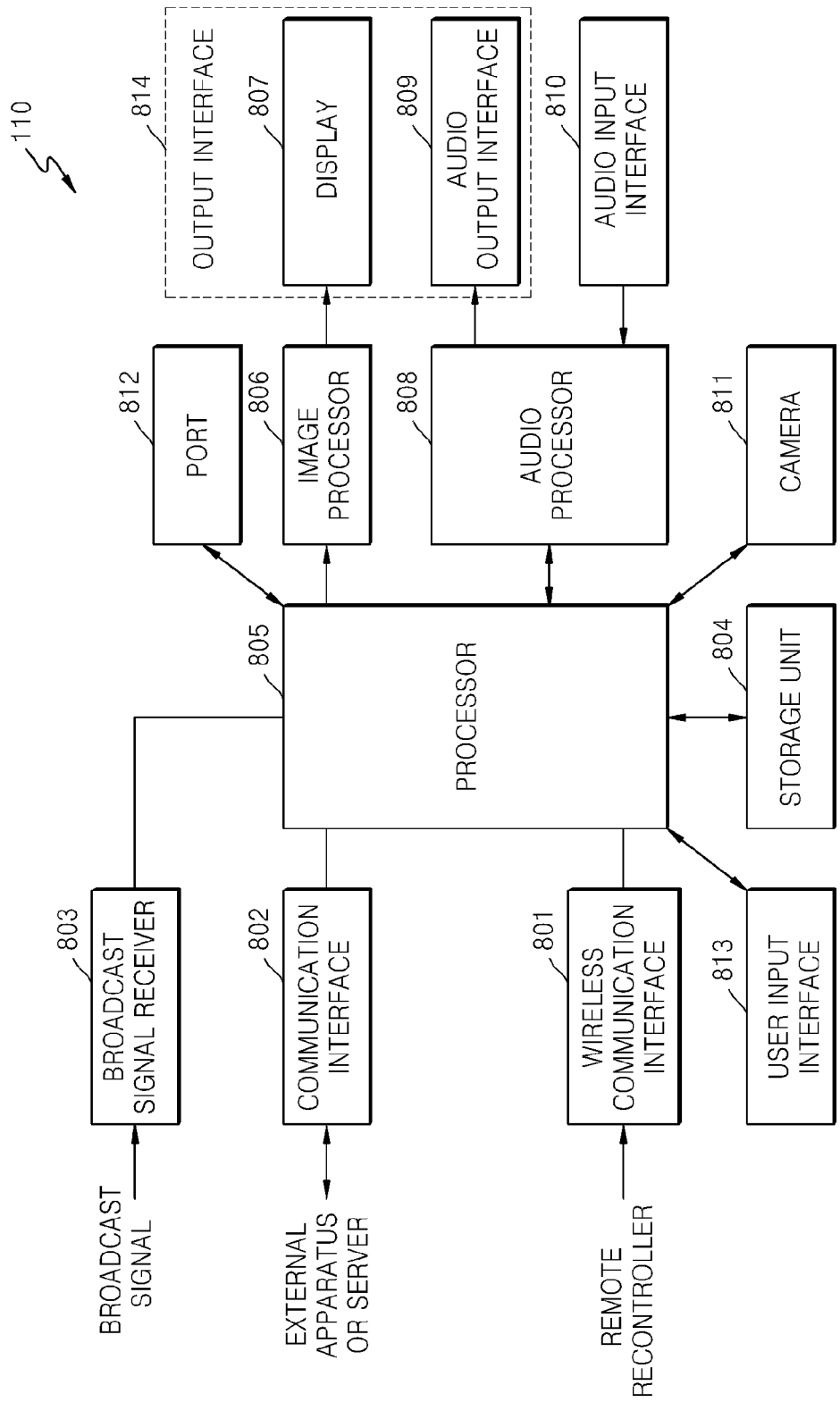
FIG. 8 is a block diagram illustrating the first apparatus according to another exemplary embodiment.

FIG. 8 is a block diagram illustrating the first apparatus 110 according to yet another embodiment. By way of an example only and not by way of a limitation, the first apparatus 110 is a smart TV having a communication function.

Referring to FIG. 8, the first apparatus 110 includes a wireless communication interface 801, a communication interface 802, a broadcast signal receiver 803, a storage 804, a processor 805, an image processor 806, a display 807, an audio processor 808, an audio output interface 809, an audio input interface 810, a camera 811, a port 812, and a user input interface 813, but it is not limited thereto and is provided by way of an example only.

The wireless communication interface 801 is configured to wirelessly communicate with a remote controller (not shown), according to an exemplary embodiment. In other words, when the remote controller is an IR transmitter, the wireless communication interface 801 may be an IR receiver so as to receive and modulate an infrared signal transmitted from the remote controller, and transmit the modulated infrared signal to the processor 805. On the other hand, when the remote controller is an RF module, the wireless communication interface 801 may be an RF module so as to receive an RF signal from the remote controller and transmit the RF signal to the processor 805. However, the wireless communication interface 801 is not limited to the IR receiver or RF module. In other words, the wireless communication interface 801 may be configured based on a short-range communication, such as a Bluetooth network. The wireless communication interface 801 may be referred to as an input information receiver for receiving input information of a user.

The communication interface 802 transmits or receives data to or from the cloud server 120 and the second apparatus 130 through the network 140 of FIG. 1, such as a wired network or a wireless network, described with reference to the communication interface 708 of FIG. 7. Accordingly, an external apparatus described to be connected to the communication interface 802 of FIG. 8 includes the second apparatus 130, and a server includes the cloud server 120, according to an exemplary embodiment.

The broadcast signal receiver 803 divides and outputs a broadcast signal received through a tuner (not shown) into an image signal and an audio signal, according to an exemplary embodiment. In other words, the tuner selects a broadcast signal corresponding to a channel selected by the user or a pre-stored channel from among broadcast signals received through an antenna. Also, the tuner converts the selected broadcast signal into an intermediate frequency signal, a baseband image signal, or an audio signal. The intermediate frequency signal, the baseband image signal, or the audio signal is input to the processor 805.

The storage 804 may store at least one program for processing various signals and controlling the processor 805, and may store information for authenticating the first apparatus 110 and information about the first apparatus 110, according to an exemplary embodiment. The information for authenticating the first apparatus 110 may include user information, which manipulates the first apparatus 110. The at least one program for processing various signals and controlling the processor 805 may include the information tagging program based on the method of FIG. 2, by way of an example, and an image search program based on a method of FIG. 13, by way of an example, that will be described later. Also, the storage 804 may include an image displayed on the display 807, information received from and information about an object selected by the user, technical information used to detect another image, and the other image with may include the object, according to an exemplary embodiment.

The processor 805 may control an overall function of the first apparatus 110, and may transmit or receive data to or from the cloud server 120 and the second apparatus 130 through the communication interface 802, according to an exemplary embodiment. The processor 805 may form a UI object or a GUI object according to an exemplary embodiment by loading at least one program stored in the storage 804, and display the UI or GUI object on the display 807 through the image processor 806. The UI or GUI object includes a UI or GUI screen. The UI or GUI object may include, for example, any screen shown in FIGS. 3A, 3B, 4, 14, and 17A through 17F.

The processor 805 may transmit and receive data for tagging information and searching for an image to and from the cloud server 120 and the second apparatus 130 through the communication interface 802. Here, the processor 805 may use at least one program and resources stored in the storage 804. The processor 805 may include at least one processor, as described above with reference to the processor 710 of FIG. 7 by way of an example and not by way of a limitation.

The image processor 806 includes an image decoder (not shown) and a scaler (not shown). The image processor 806 processes an image signal output from the broadcast signal receiver 803 to be displayed on a screen, according to an exemplary embodiment. The image decoder decodes a de-multiplexed image signal and the scaler scales resolution of the decoded image signal to be output on the display 807. The image decoder may include decoders having various standards. For example, when the de-multiplexed image signal is an image signal encoded according to the MPEG-2 standard, the image signal may be decoded by an MPEG-2 decoder. Alternatively, in an exemplary embodiment, when the de-multiplexed image signal is an image signal encoded in the H.264 standard according to a digital multimedia broadcasting (DMB) method or DVB-H, the image signal may be decoded by an H.264 decoder. The image processor 806 may also process an image read from the storage 804 or received through the communication interface 802 to be displayed on the display 807.

The display 807 may output an image processed by the image processor 806. The output image may be an image received from the broadcast signal receiver 803, a UI or GUI object, or an image according to execution of an application received from the cloud server 120 and the second apparatus 130 through the communication interface 802. Alternatively, in an exemplary embodiment, the display 807 may be configured analogous to the touch screen 703 of FIG. 7 to be used as an input device by way of an example and not by way of a limitation.

The audio processor 808 processes and outputs an audio signal output from the broadcast signal receiver 803 and an audio signal included in content received through the communication interface 802 to the audio output interface 809. The audio output interface 809 may be realized in any one of various forms, for example, the audio output interface 809 may output a stereo signal, a 3.1 channel signal, or a 5.1 channel signal.

Also, the audio processor 808 may process and transmit a signal received from the audio input interface 810 to the processor 805. The audio input interface 810 may include a microphone by way of an example and not by way of a limitation.

The display 807 and the audio output interface 809 may be defined as an output interface 814 for outputting UI information according to information input through the wireless communication interface 801 or the user input interface 813, or information according to a UI object and execution of an application, according to an exemplary embodiment.

Since, in an exemplary embodiment, the camera 811, the port 812, and the user input interface 813 of FIG. 8 may operate in the similar manners as the camera 702, the port 709, and the user input interface 701 of FIG. 7, respectively, repeated descriptions thereof are not provided.

Figure 9:
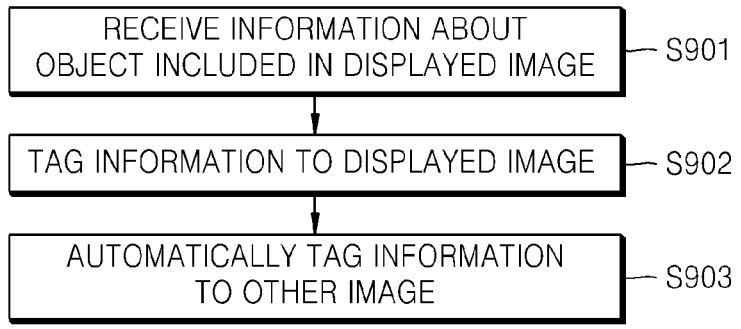
FIG. 9 is a flowchart illustrating a method of tagging information about an image, according to an exemplary embodiment.

FIG. 9 is a flowchart illustrating a method of tagging information about an image, according to an exemplary embodiment. The method of FIG. 9 may be performed by using at least one program and resources stored in the storage 502, 707, or 804 according to the processors 505, 710, or 805 of the first apparatus 110, respectively, by way of an example and not by way of a limitation. For convenience of description, the method is described to be performed by the processor 505, according to an exemplary embodiment.

As described above with reference to FIG. 2, the processor 505 receives information about at least one object included in an image displayed on the output interface 504 from a user in operation S901, and tags the information to the displayed image in operation S902.

Figure 10:
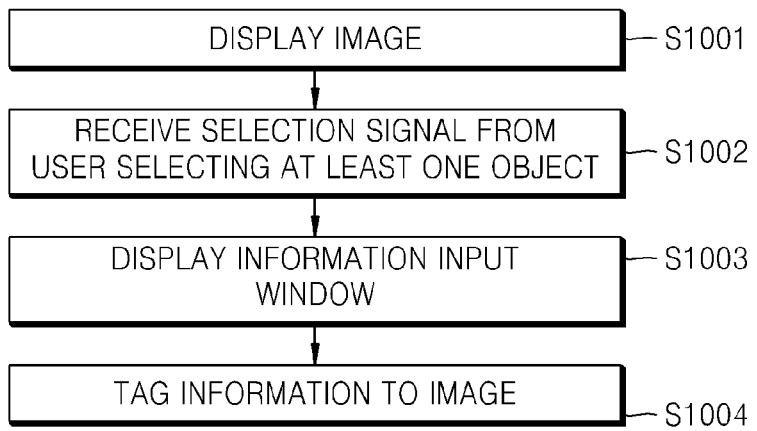
FIG. 10 is a flowchart illustrating tagging of information to an image according to an exemplary embodiment.

FIG. 10 is a flowchart illustrating tagging of information to an image such as operations S901 and S902 of FIG. 9 according to an exemplary embodiment.

Referring to FIG. 10, the processor 505 displays the screen 310 of FIG. 3A or the image 354 in the screen 350 of FIG. 3B, in operation S1001, by way of an example. However, the image is not limited to the screen 310 or the image 354. The image displayed on the output interface 504 may be captured by the first apparatus 110 or received from the second apparatus 130 or the cloud server 120, as described above, by way of an example.

Upon receiving a selection signal of the user in which at least one object included in the image displayed on the output interface 504 is selected using the input information receiver 501 in operation S1002, the processor 505 displays the popup window 331 including the information input window 332, as shown in the screen 330 of FIG. 3A, or the screen 350 including the information input window 355 of FIG. 3B on the output interface 504, in operation S1003, by way of an example.

When information is received from the user using the information input window 332 or 355, the processor 505 tags the information to the image displayed on the output interface 504 in operation S1004, for example as described above with reference to FIG. 2.

Referring back to FIG. 9, the processor 505 automatically tags the information received in operation S901 to another image which includes the selected object, in operation S903.

Figure 11:
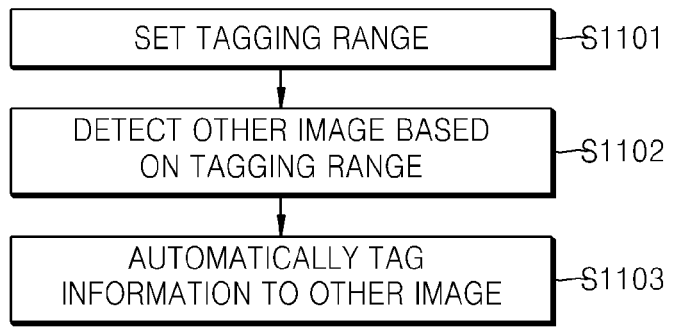
FIG. 11 is a flowchart illustrating automatically tagging of information to another image according to an exemplary embodiment.

FIG. 11 is a flowchart illustrating automatically tagging of information to another image such as operation S903 of FIG. 9, according to an exemplary embodiment.

Referring to FIG. 11, the processor 505 outputs information about a selectable tagging range using the output interface 504, for example as described above with reference to the popup window 331 of FIG. 3A, or the screen 360 of FIG. 3B. When a selection signal selecting a tagging range is received from the user using the input information receiver 501, the processor 505 sets a tagging range according to the selection signal, in operation S1101.

The processor 505 detects the other image based on the tagging range in operation S1102. An exemplary method of detecting the other image based on the tagging range has been described above with reference to FIG. 2, which is provided by way of an example and not by way of a limitation.

FIG. 12 is a flowchart illustrating detecting of another image such as operation S1102 of FIG. 11, according to an exemplary embodiment. In FIG. 12, the other image is detected by the first apparatus 110. Referring to FIG. 12, the processor 505 analyzes a selected object in operation S1201, and detects the other image by using the analyzed result in operation S1202.

In other words, in operation S1201, the processor 505 extracts a face region from an object included in a displayed image by using a face region extraction technology, detects a feature value of the selected object, as described above with reference to FIG. 2 by way of an example, by using at least one of a face recognition technology, an object recognition technology, a character recognition technology, a contour detection technology, and a feature point detection technology, and includes information indicating whether a face of a person is included in the selected object to the feature value if required. Thus, the analyzed result includes the feature value.

In operation S1202, the other image is detected by using the feature value obtained according to the analyzing in operation S1201. In other words, a face region is extracted from an object included in a first image by using a face region extraction technology, as described above with reference to FIG. 2 by way of an example, a feature value is detected in the extracted face region by using at least one of a face recognition technology, an object recognition technology, a character recognition technology, a contour detection technology, and a feature point detection technology, and when an error value between the feature value of the object included in the first image and the feature value detected in operation S1202 is within a predetermined threshold range, the processor 505 detects the first image as the other image which includes the feature value. The first image is stored in the storage 502.

However, if the set tagging range is "All Devices", the other image may be detected from images stored in the storage 502 while an external apparatus analyzes an object included in the other image, as described above with reference to FIG. 2 by way of an example, according to the method of FIG. 12 by transmitting an information automatic tagging request signal to the external apparatus connected through the communication interface 503, the other image which includes the feature value may be detected by using the analyzed result, and information may be automatically tagged to the other detected image. Alternatively, in an exemplary embodiment, the external apparatus may detect and transmit the other image to the processor 505 through the communication interface 503 according to the information automatic tagging request signal transmitted to the external apparatus.

In FIG. 11, the processor 505 automatically tags the information to the other image which includes the feature value, in operation S1103. The information may be tagged to the other image which includes the feature value by inserting or adding the information to metadata (for example, EXIF) of the other image which includes the feature value.

FIG. 13 is a flowchart illustrating a method of searching for an image according to an exemplary embodiment.

Referring to FIG. 13, a search word input window is displayed on the first apparatus 110, in operation S1301. In other words, when a search word input window 1411 is displayed, as shown by way of an example in a screen 1410 of FIG. 14, a window 1412 of a completed search word (predictive words) is additionally displayed according to input "C". The completed search word (predictive words) may be provided based on pre-set information. Alternatively, in an exemplary embodiment, a desired search word may be input by the user regardless of the window 1412.

When the search word is input based on the search word input window 1411 in operation S1302, the first apparatus 110 not only searches for an image including the search word in the metadata in operation S1303, but also requests other apparatuses connected to the first apparatus 110 to perform a search based on the search word in operations S1304 and S1305. Accordingly, not only the first apparatus 110, but also the cloud server 120 and the second apparatus 130 search for an image based on the search word in operations S1306 and S1307, and the first apparatus 110 receives the found images from the cloud server 120 and the second apparatus 130 in operations S1308 and S1309.

Alternatively, in an exemplary embodiment, after the search word is input, a search range may be set. In other words, when the search word is input into the search word input window 1411 e.g., "CHOAN" is selected in the window 1412 using predictive words, information for setting a search range may be displayed at a bottom of the search word input window 1411 as shown in a screen 1420 or only information for setting a search range may be displayed on a window independent from the search word input window 1411 as shown in a screen 1430, according to an exemplary embodiment.

When the search range is set based on the information about the search range, the first apparatus 110 may selectively perform operations S1303 through S1307 according to the set search range, in an exemplary embodiment.

In other words, when "All Devices" 1421 is selected as the search range, images stored not only the first apparatus 110, but also in all apparatuses connected to the first apparatus 110 are searched. When "Current Device" 1422 is selected as the search range, images stored in the first apparatus 110 are searched. When "Cloud" 1423 is selected as the search range, images stored in the cloud server 120 connected to the first apparatus 110 are searched. When "Peripherals" 1424 is selected as the search range, images stored in the second apparatus 130 connected to the first apparatus 110 are searched. As such, when a search key 1413 is controlled after the search range is selected, the first apparatus 110 performs a search based on the selected search range, according to an exemplary embodiment.

Figure 14:
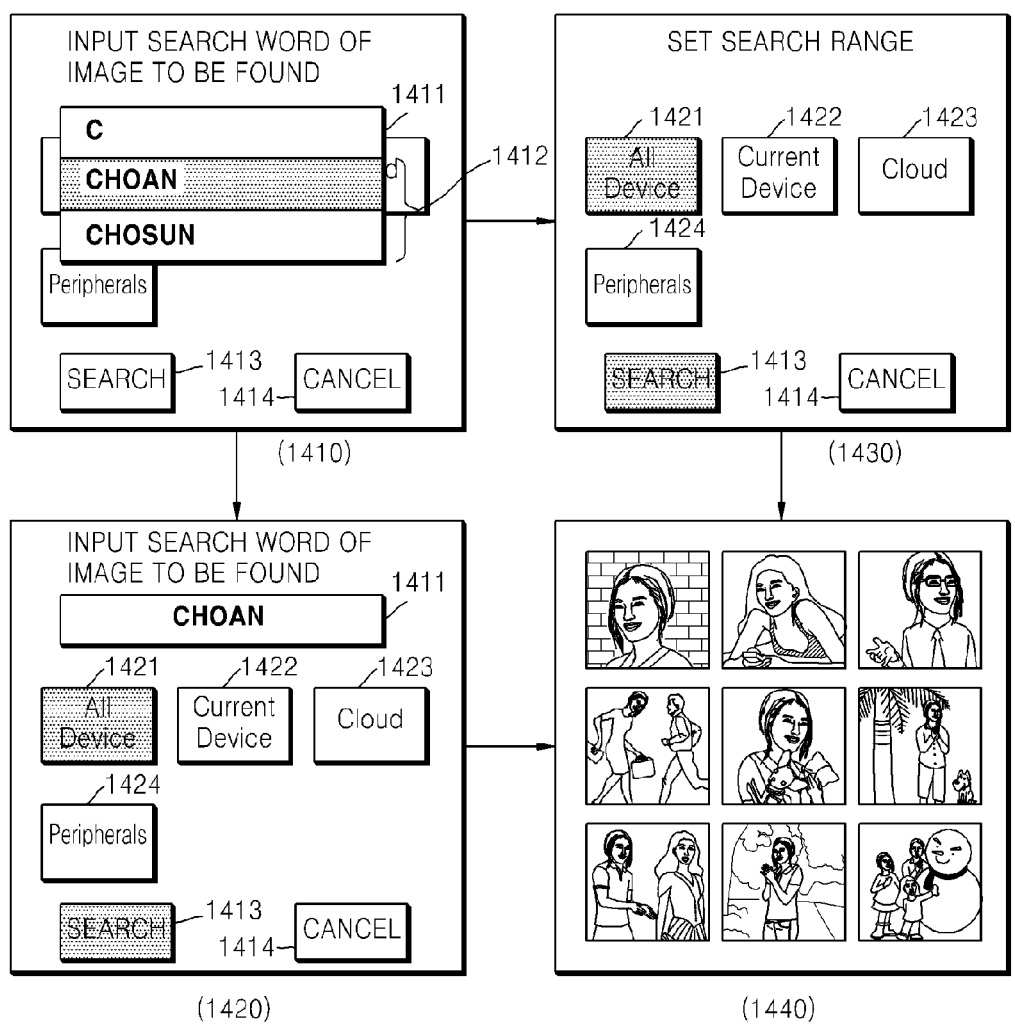
FIG. 14 is a view illustrating exemplary screens for describing a process of searching for an image according to an exemplary embodiment.

When an image is searched for based on the search range, the first apparatus 110 outputs the found image in operation S1310. The number of output images may be one or more. The image may be searched for by detecting a search word field from metadata of the image, and determining whether a search word in the detected search word field matches the input search word, but the image may be searched for by using any other method. The found image may be displayed as shown in a screen 1440 of FIG. 14, by way of an example. In FIG. 14, "CHOAN" is depicted in screen 1440 when Choan was input as a search word, as shown in screen 1410, an exemplary embodiment of tagging Choan was described with reference to FIG. 4. Accordingly, all images included in the screen 1440 include the object included in the screen 310 of FIG. 3A, by way of an example.

Figure 15:
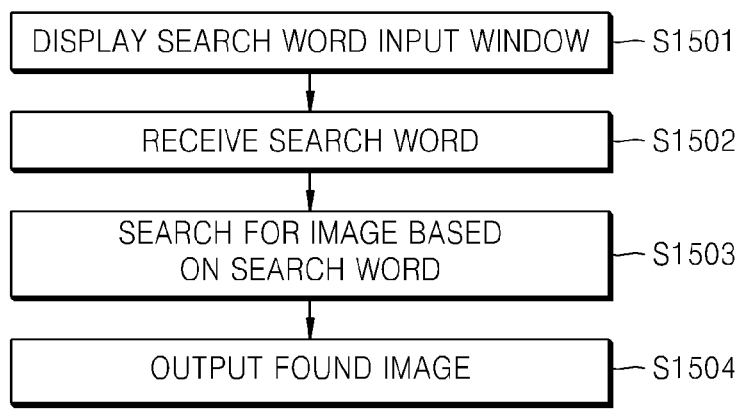
FIG. 15 is a flowchart illustrating a method of searching for an image, according to another exemplary embodiment.

FIG. 15 is a flowchart illustrating a method of searching for an image, according to another exemplary embodiment. The method of FIG. 15 may be performed by the processor 505, 710, or 805 of the first apparatus 110, by way of an example and not by way of a limitation. For convenience of description only, the method is described to be performed by the processor 505.

When an execution of an image search is requested using the input information receiver 501, the processor 505 displays a search word input window on the output interface 504 such as the window 1411 shown in FIG. 14, in operation S1501. The search word input window 1411 is included in a GUI object. Upon receiving a search word using the search word input window 1411 displayed on the output interface 504 in operation S1502, the processor 505 searches for an image based on the search word in operation S1503. Operation S1503 may be performed according to a search range set as a default in the first apparatus 110. Alternatively, according to an exemplary embodiment, as described by way of an example with reference to FIGS. 13 and 14, the image may be searched for according to a search range set by the user. When the set search range does not match a connection state of the first apparatus 110, the image may be searched for within a search range matching the connection state of the first apparatus 110.

For example, when the search range is "Cloud", but there is no cloud server connected to the first apparatus 110, the first apparatus 110 may not search for an image. In this case, the processor 505 may output an error message for the user. However, when the cloud server 120 is connected to the first apparatus 110, the first apparatus 110 searches for an image based on images stored in the cloud server 120. When the search range is "All Devices" and an apparatus connected to the first apparatus 110 is the second apparatus 130, images stored in the first and second apparatuses 110 and 130 may be searched. The images may be searched according to the method of FIG. 13, by way of an example.

The processor 505 outputs the found image on a screen for example the screen 1440 shown in FIG. 14, in operation S1504. If there are a plurality of found images, a display form of the images is not limited to the screen 1440, and may vary.

For example, the found images may be displayed in a panorama. Alternatively, in an exemplary embodiment, the found images may be displayed in an overlapping form according to a found order, and when the user requests to display an image in a following order, a currently displayed image that is first found may be displayed in another screen region or hidden below an image found later, and the image found last may be displayed on top and the remaining images may be displayed based on the order in which they were found.

Figure 16:
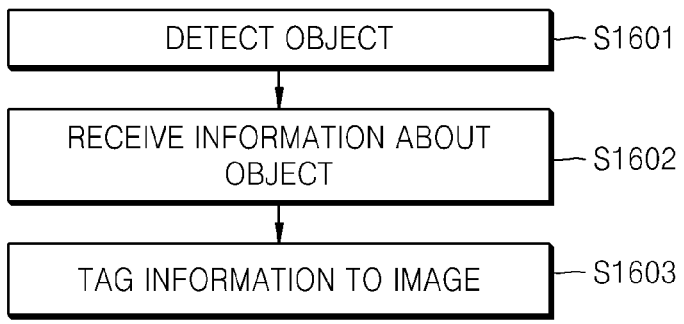
FIG. 16 is a flowchart illustrating a method of tagging information about an image, according to another exemplary embodiment.

FIG. 16 is a flowchart illustrating a method of tagging information about an image, according to another exemplary embodiment. The method of FIG. 16 may be performed by the first apparatus 110. Accordingly, the storage 502, 707, or 804 of the first apparatus 110 may be defined to store a program and information required based on the method of FIG. 16, by way of an example. Thus, operations of the method in FIG. 16 are performed in the processor 505, according to an exemplary embodiment. Alternatively, the method of FIG. 16 may be performed by the processor 710 or the processor 805, or the cloud server 120 or the second apparatus 130 based on a request of the first apparatus 110, according to various exemplary embodiments. When the method is performed by the cloud server 120 or the second apparatus 130, the first apparatus 110 transmits a displayed image or information about the displayed image to the cloud server 120 or the second apparatus 130.

The processor 505 detects at least one object included in an image displayed on the output interface 504 in operation S1601. A method of detecting an object may be performed in an analogous manner as detecting a feature value of an object described above with reference to FIG. 2, by way of an example. FIGS. 17A through 17F are examples of screens for describing the method of FIG. 16.

Figure 17A:
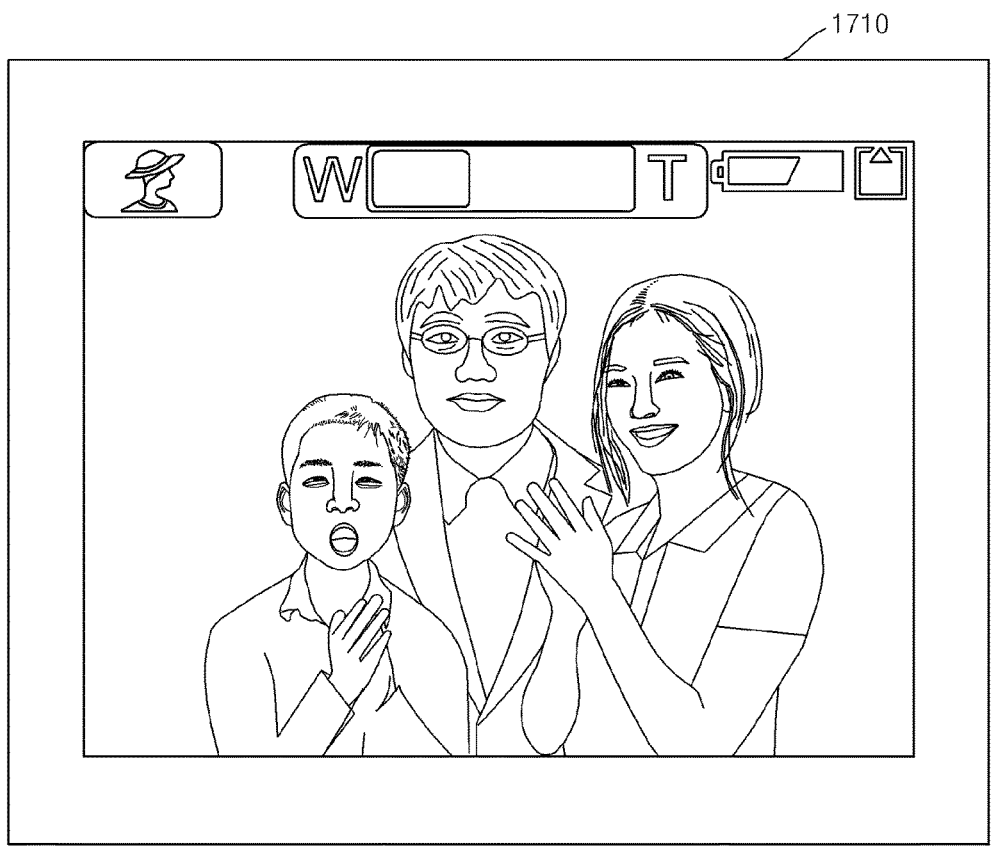
FIGS. 17A through 17F are views illustrating exemplary screens for describing the method of tagging information about an image according to another exemplary embodiment.

If the image displayed on the output interface 504 is similar to an image 1710 of FIG. 17A, the processor 505 may recognize an object included in the image 1710 by using a face region extracting method and a face recognition technology such as the ones described above with reference to FIG. 2. Here, the processor 505 may detect a feature value of each object and store the feature value in the storage 502.

In order to recognize the object included in the image displayed on the output interface 504, the processor 505 may further use at least one of an object recognition technology, a character recognition technology, a contour detection technology, and a feature point detection technology such as the ones described above with reference to FIG. 2. Further use of at least one of the object recognition technology, the character recognition technology, the contour detection technology, and the feature point detection technology may be pre-set. For example, when a face region is not extracted by using the face region extracting method, one of the above technologies may be selected and used according to a predetermined priority. Alternatively, in an exemplary embodiment, when the face region is extracted, but the face recognition technology and the contour detection technology are to be used to obtain a detailed feature value, the face recognition technology and the contour detection technology may also be used along with the face region extracting method. However, the detecting of the object included in the displayed image is not limited thereto but is provided by way of an example.

Figure 17B:
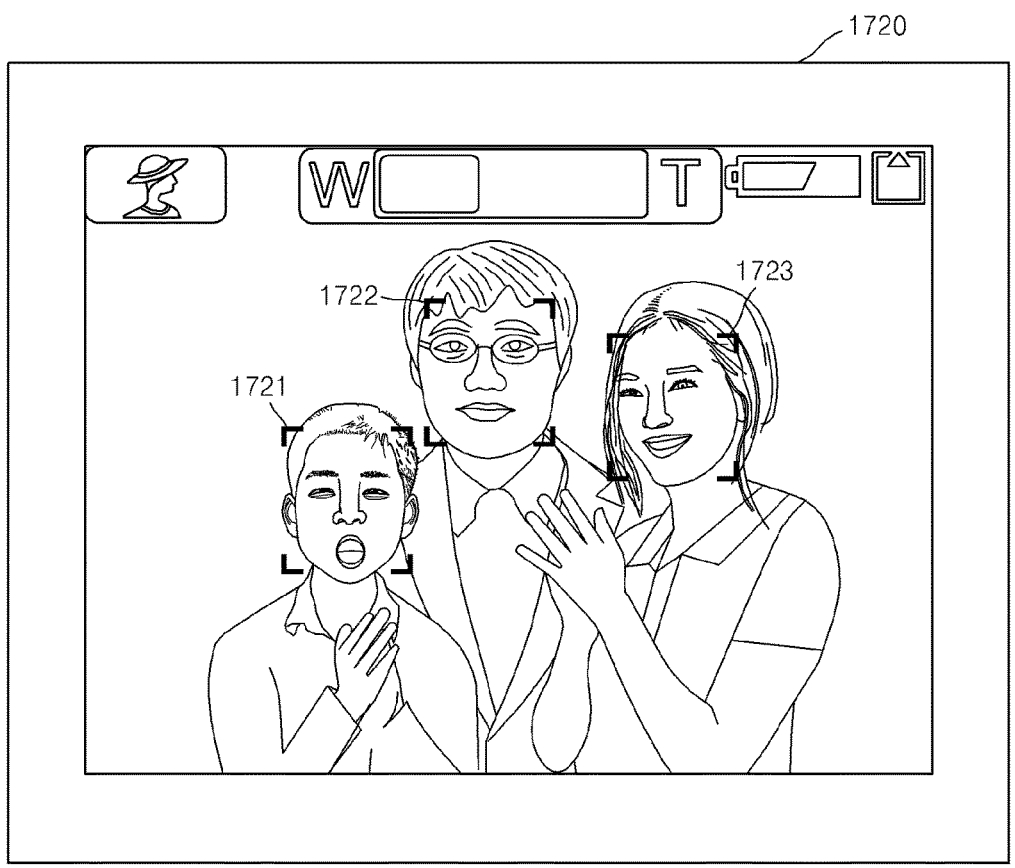

After the object is detected, the processor 505 may display an image 1720, wherein information 1721, 1722, and 1723 indicating the detected objects is displayed on an image, on the output interface 504, as shown in FIG. 17B, according to an exemplary embodiment. The information 1721, 1722, and 1723 may be defined to be displayed on a focal region of a camera as shown in FIG. 17B, but alternatively, in an exemplary embodiment, may be defined to be displayed in a closed path, as shown by way of an example, in the screen 320 of FIG. 3A or the screen 350 of FIG. 3B.

Alternatively, in an exemplary embodiment, after the object is detected, the processor 505 may not display the information 1721, 1722, and 1723, as shown in FIG. 17B, but may display a message indicating the completion of object recognition or continuously display the image 1710. When an image is displayed on the output interface 504, the processor 505 may perform a process of detecting at least one object included in the displayed image.

The processor 505 may receive at least one piece of information about the detected object from the user in operation S1602. Accordingly, the processor 505 may receive a selection signal with respect to the detected object from the user. The selection signal may be received with respect to all detected objects or at least one of the detected objects.

Figure 17C:
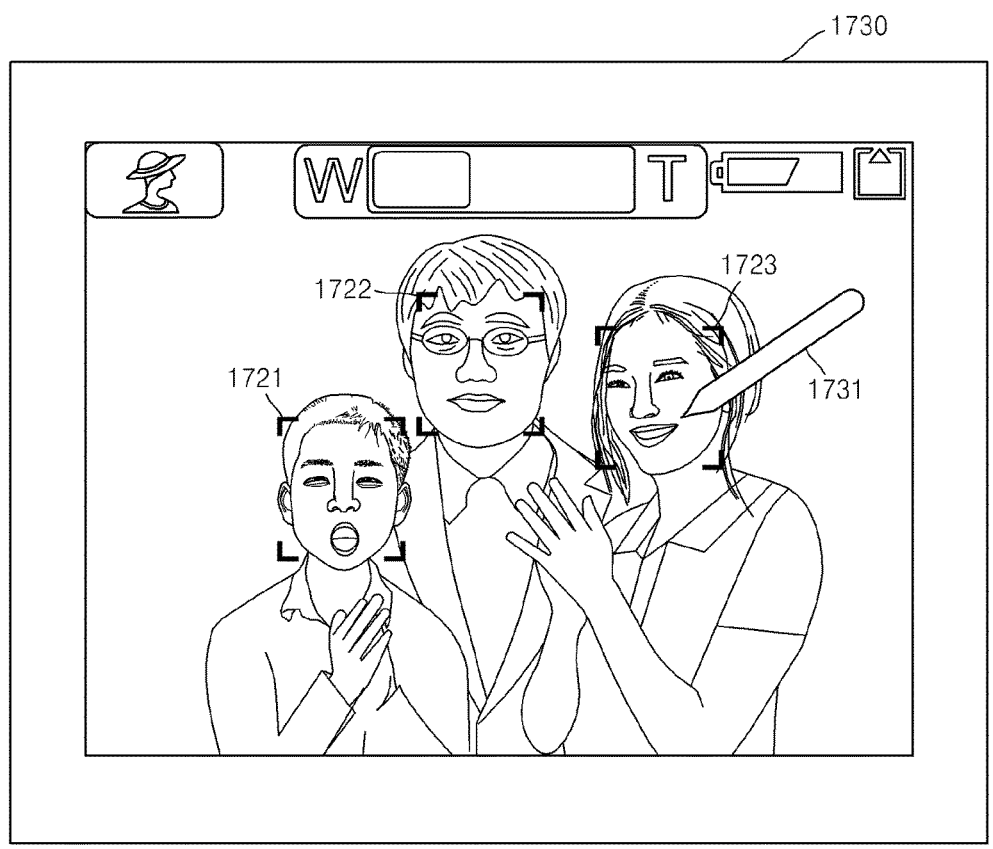

In other words, when the information 1721, 1722, and 1723 is displayed as shown in FIG. 17B, the processor 505 receives a selection signal on an object corresponding to information 1723 indicating the object, as a touch using for example a stylus pen 1731, shown in FIG. 17C. The selection of the object corresponding to the information 1723 is then detected. A touch region capable of receiving the selection signal is a focus region based on a location where the information 1721, 1722, and 1723 is displayed in FIG. 17C, according to an exemplary embodiment. Accordingly, when the stylus pen 1731 or a finger of the user touches a predetermined region in the information 1721, 1722, and 1723, the processor 505 may receive a selection signal from the user of the corresponding object.

Figure 17D:
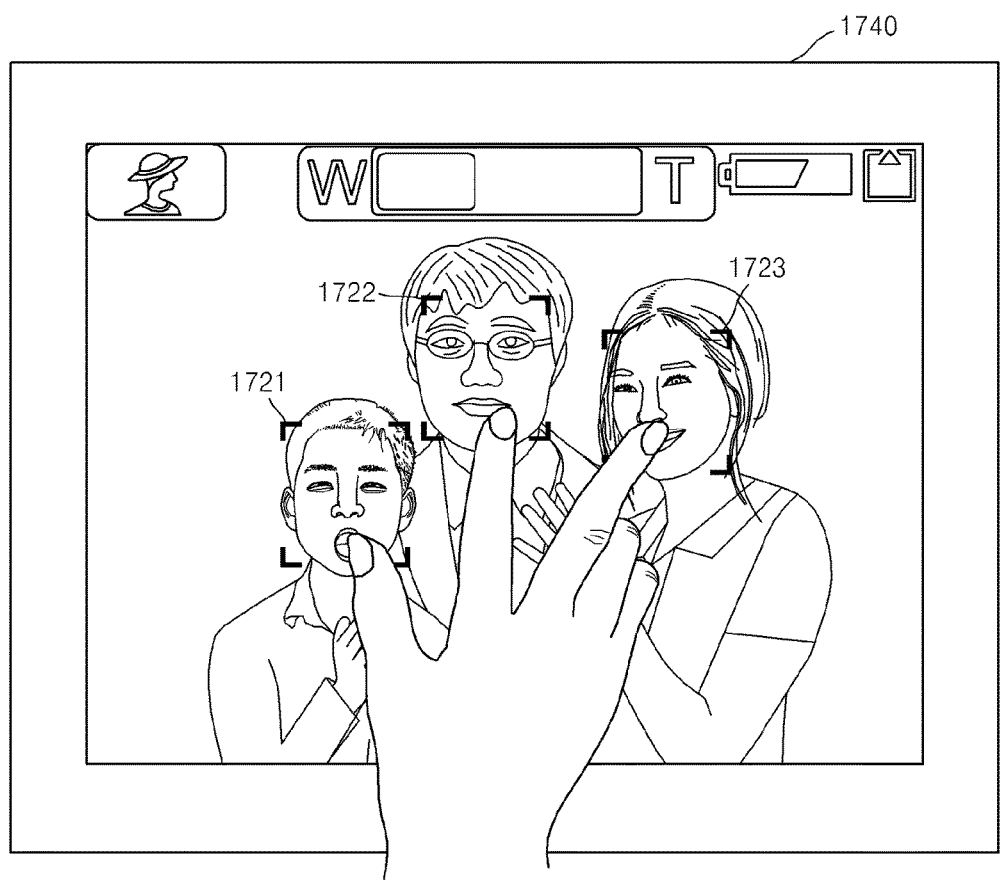

Alternatively, in an exemplary embodiment, as shown in FIG. 17D, the processor 505 may receive a selection signal on a plurality of objects corresponding to the information 1721, 1722, and 1723 for example as a multi-touch using the fingers, the touch of these objects is detected and corresponds to the information 1721, 1722, and 1723.

Figure 17E:
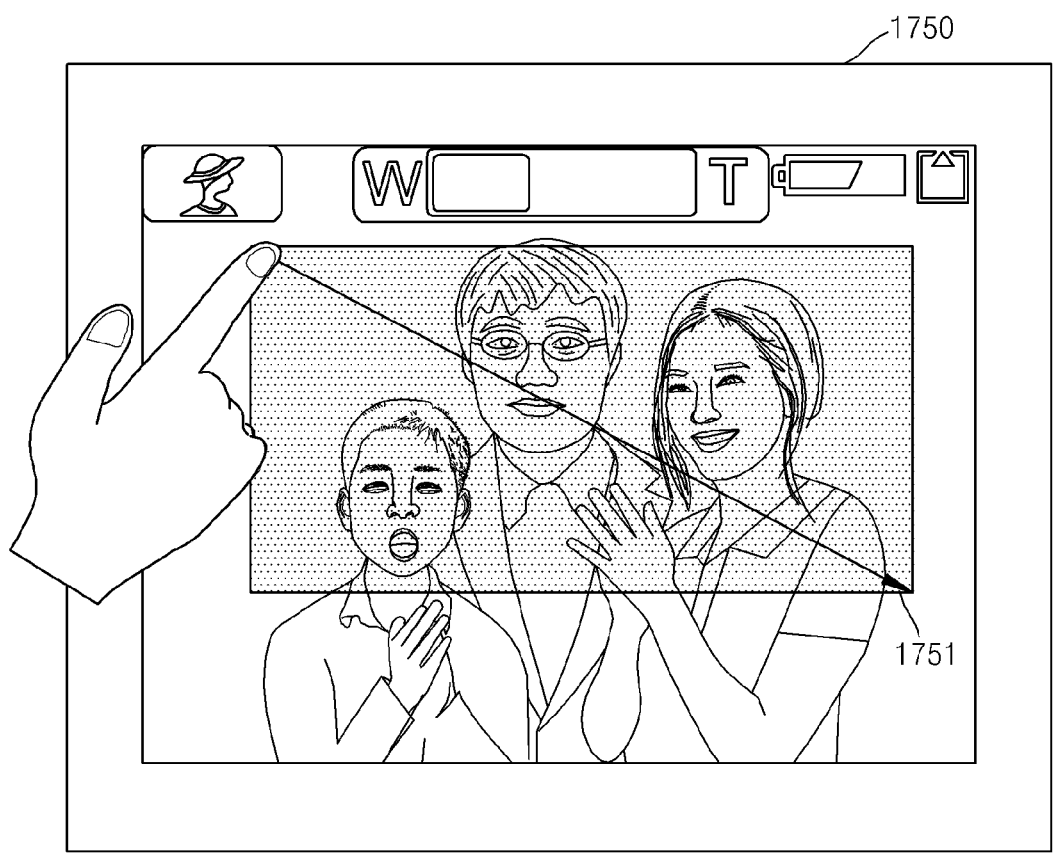

Alternatively, according to an exemplary embodiment, as shown in FIG. 17E, the processor 505 may receive a selection signal on a plurality of objects included in the region 1751 as the region 1751 is set via touch-and-drag input on an image 1750.

However, the receiving of the selection signal is not limited to a touch base as shown in FIGS. 17C through 17E, according to an exemplary embodiment. In other words, the selection signal may be received based on a space gesture of the user indicating selection of the detected object. For example, when the information 1721, 1722, and 1723 is displayed on the image 1720 of FIG. 17B or information about a detected object is not displayed on the image 1710 of FIG. 17A, the processor 505 may receive the selection signal based on a space gesture of the user pointing at an object to be selected, according to an exemplary embodiment.

Figure 17F:
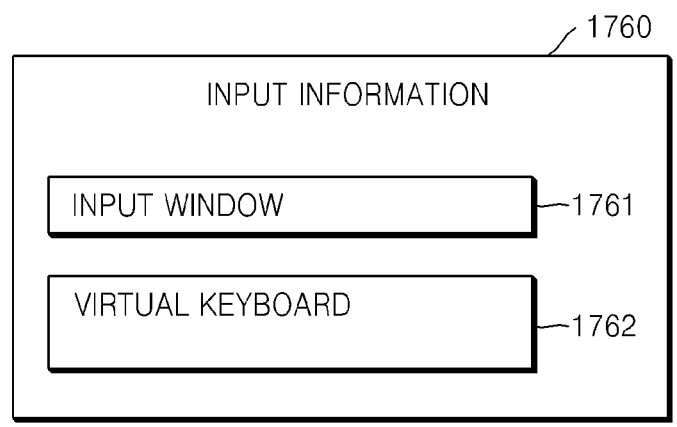

Upon receiving the selection signal, the processor 505 displays a screen 1760 including an input window 1761 for receiving information about the selected object, and a virtual keyboard 1762 for inputting the information, on the output interface 504, as shown in FIG. 17F, according to an exemplary embodiment. The input window 1761 and the virtual keyboard 1762 may be defined to be included in a GUI object. Accordingly, in an exemplary embodiment, the information about the selected object input through the input window 1761 and the virtual keyboard 1762 may be defined to be received using the GUI object.

The information input by using the input window 1761 and the virtual keyboard 1762 includes information indicating an intention of the user on the selected object. The information indicating the intention corresponds to the information indicating the intention described above with reference to FIGS. 3A and 3B, by way of an example and not by way of a limitation.

When the information is input, the processor 505 tags the information to the displayed image for example as described in operation S1603 of FIG. 16. In other words, as described above with reference to FIG. 2, according to an exemplary embodiment, the information may be tagged to the displayed image by adding the information to metadata of the displayed image.

Figure 18:
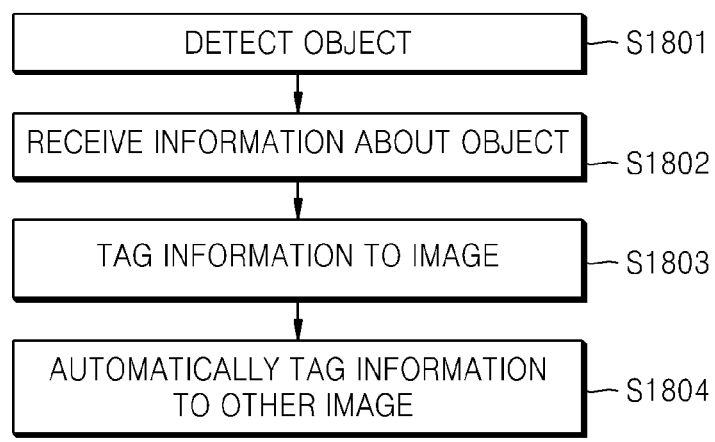
FIG. 18 is a flowchart illustrating a method of tagging information about an image, according to another exemplary embodiment.

FIG. 18 is a flowchart illustrating a method of tagging information about an image, according to another exemplary embodiment. In the method of FIG. 18, operation such as exemplary operation S903 of the method described with reference to FIG. 9 is added to the exemplary method of FIG. 16. Accordingly, in an exemplary embodiment, operations S1801 through S1803 of FIG. 18 are somewhat analogous to operations S1601 through S1603 of FIG. 16, and in operation S1804, the other image with includes the feature or element of interest is detected and information received from the user in operation S1802 is automatically tagged to the other image someone analogous to the operation S903 of FIG. 9.

In exemplary embodiments, the methods based on FIGS. 13 through 15 may be performed by using the information tagged to the image according to the methods of FIGS. 16 through 18.

Exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While exemplary embodiments have been particularly shown and described, it will be understood by those of ordinary skill in the art that various changes in form and details may be made therein without departing from the spirit and scope of an inventive concept as defined by the appended claims. The exemplary embodiments should be considered in a descriptive sense only and not for purposes of limitation. Therefore, the scope of exemplary embodiments is defined not by the detailed description of the exemplary embodiments but by the appended claims, and all differences within the scope will be construed as being included in the inventive concept.

What is claimed is:

1. A method of tagging of information using an apparatus capable of displaying an image, the method comprising:
receiving, by a processor of the apparatus, a selection of at least one object in an image displayed on the apparatus;
receiving, by the processor, tagging information with respect to the selected object after receiving the selection of the at least one object;
based on receiving the tagging information, tagging, by the processor, the tagging information to the displayed image including the selected object;
displaying information regarding at least one tagging range indicating a source of another image;
receiving, by the processor, a user input for selecting a tagging range among the displayed information regarding the at least one tagging range;
based on receiving the user input, detecting at least one other image including the selected object in the selected tagging range; and
automatically tagging, by the processor, the tagging information to the detected at least one other image.

2. The method of claim 1, further comprising:
setting a region of the selected object within the displayed image in response to receiving the selection of the at least one object; and
detecting the selected object in the set region.

3. The method of claim 1, wherein the tagging information comprises information indicating meaning of the selected object for the user.

4. The method of claim 1, wherein the tagging of the received information comprises adding the tagging information to metadata of the displayed image.

5. The method of claim 1, wherein the detected at least one other image comprises an image stored in at least one external apparatus connected to the apparatus.

6. The method of claim 5, wherein the at least one external apparatus comprises at least one of at least one cloud server and at least one peripheral apparatus related to the apparatus.

7. The method of claim 1, wherein the detected at least one other image comprises at least one image which is displayed together with the displayed image on the apparatus.

8. The method of claim 1, wherein the tagging range comprises information indicating a location of the source where the one other image is stored.

9. The method of claim 1, wherein the detecting of the at least one other image including the selected object is performed based on a feature value of the selected object.

10. The method of claim 1, wherein the tagging information comprises a characteristic or an attribute of the selected object, which is received from the user.

11. The method of claim 10, further comprising:
receiving a search word input by a user of the apparatus;
searching for metadata of each image in a set range based on the received search word; and
displaying, on the apparatus, each found image for which the metadata comprises the received search word,
wherein the search word corresponds to the tagging information about the image.

12. The method of claim 1, wherein the tagging information comprises custom information input by the user which relates to the selected object.

13. The method of claim 1, further comprising: based on the selected object in the displayed image, providing, to the user, suggestions for the tagging information with respect to the selected object, wherein the suggestions are predictive words tailored to the user and pre-stored in the apparatus.

14. An apparatus comprising:
an input interface;
a display; and
a processor, which is configured to:
receive, via the input interface, a selection of at least one object in an image displayed on the display,
receive tagging information with respect to the selected object after receiving the selection of the at least one object via the input interface,
based on receiving the tagging information, tag the tagging information to the displayed image including the selected object, control the display to display information regarding at least one tagging range indicating a source of another image, receive a user input for selecting a tagging range among the displayed information regarding the at least one tagging range via the input interface, based on receiving the user input, detect at least one other image including the selected object in the selected tagging range, and automatically tag the tagging information to the detected at least one other image.

15. The apparatus of claim 14, further comprising:
a communicator configured to communicate with at least one external apparatus; and a memory storing the tagging information about the image displayed by the display and a program for tagging the tagging information to the at least one other image.

16. The apparatus of claim 14, wherein the tagging information comprises information indicating meaning of the selected object for the user.

17. The apparatus of claim 14, wherein the processor is further configured to add the tagging information to metadata of the displayed image when tagging the tagging information to the displayed image.

18. The apparatus of claim 14, wherein the detected at least one other image comprises an image stored in at least one external apparatus connected to the apparatus.

19. The apparatus of claim 18, wherein the at least one external apparatus comprises at least one of at least one cloud server and at least one peripheral apparatus related to the apparatus.

20. The apparatus of claim 14, wherein the at least one other image comprises at least one image displayed together with the displayed image on the display.

21. The apparatus of claim 14, wherein the tagging range comprises information indicating location of the source where the other image is stored.

22. The apparatus of claim 14, wherein the processor detects the at least one other image including the selected object based on a feature value of the selected object.

23. A non-transitory computer-readable recording medium having recorded thereon one or more programs for executing a method of tagging of information to an image by an apparatus, the method comprising:
  receiving, by a processor of the apparatus, a selection of at least one object in an image displayed on the apparatus;
  receiving, by the processor, tagging information with respect to the selected object after receiving the selection of the at least one object;
  based on receiving the tagging information, tagging, by the processor, the tagging information to the displayed image including the selected object;
  displaying information regarding at least one tagging range indicating a source of the another image;
  receiving, by a processor, a user input for selecting a tagging range among the displayed information regarding the at least one tagging range;
  based on receiving the user input, detecting at least one other image including the selected object in the selected tagging range; and
  automatically tagging, by the processor, the tagging information to the detected at least one other image.

24. The non-transitory computer-readable recording medium of claim 23, wherein the detecting of the at least one other image including the selected object is performed based on a feature value of the selected object.

25. A system for tagging of information to an image, the system comprising:
  an apparatus configured to:
    receive a selection of at least one object in an image displayed on the apparatus,
    receive tagging information with respect to the selected object after receiving the selection of the at least one object,
    based on receiving the tagging information, tag the tagging information to the displayed image including the selected object,
    display information regarding at least one tagging range indicating a source of another image,
    receive a user input for selecting a tagging range among the displayed information selected object in the selected tagging range, and
    automatically tag the tagging information to the detected at least one other image; and
  at least one external apparatus configured to store the at least one other image.

26. The system of claim 25, wherein the apparatus detects the at least one other image including the selected object based on a feature value of the selected object.

* * * * *